US011826661B2

(12) United States Patent
Zhang et al.

(10) Patent No.: US 11,826,661 B2
(45) Date of Patent: Nov. 28, 2023

(54) INFORMATION DISPLAY METHOD AND APPARATUS FOR VIRTUAL OBJECT, TERMINAL, SERVER, AND STORAGE MEDIUM

(71) Applicant: TENCENT TECHNOLOGY (SHENZHEN) COMPANY LIMITED, Guangdong (CN)

(72) Inventors: Yi Cheng Zhang, Shenzhen (CN); Yan Wei Zhang, Shenzhen (CN); Xing He, Shenzhen (CN); Wei Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 678 days.

(21) Appl. No.: 17/029,829

(22) Filed: Sep. 23, 2020

(65) Prior Publication Data

US 2021/0001235 A1 Jan. 7, 2021

Related U.S. Application Data

(63) Continuation of application No. PCT/CN2019/096629, filed on Jul. 19, 2019.

(30) Foreign Application Priority Data

Aug. 30, 2018 (CN) .......................... 201811003685.X

(51) Int. Cl.
*A63F 13/825* (2014.01)
*A63F 13/55* (2014.01)

(52) U.S. Cl.
CPC ............ *A63F 13/825* (2014.09); *A63F 13/55* (2014.09); *A63F 2300/204* (2013.01); *A63F 2300/303* (2013.01); *A63F 2300/8058* (2013.01)

(58) Field of Classification Search
CPC .. A63F 13/825; A63F 13/55; A63F 2300/204; A63F 2300/303; A63F 2300/8058
(Continued)

(56) References Cited

U.S. PATENT DOCUMENTS 7,025,675 B2* 4/2006 Fogel ...................... A63F 13/12
463/9
8,287,372 B2* 10/2012 Hong .................... A63F 13/245
463/32
(Continued)

FOREIGN PATENT DOCUMENTS

CN 101676922 A 3/2010
CN 2012090928 A 5/2012
(Continued)

OTHER PUBLICATIONS

International Search Report for PCT/CN2019/096629 dated, dated Sep. 30, 2019 (PCT/ISA/210).
(Continued)

*Primary Examiner* — Allen Chan
(74) *Attorney, Agent, or Firm* — Sughrue Mion, PLLC

(57) ABSTRACT

An information display method for a virtual object, performed by a terminal on which a virtual object application program is run, is provided. The method includes: obtaining an instruction to display genealogy information corresponding to a target virtual object; obtaining the genealogy information of the target virtual object based on the instruction, the genealogy information of the target virtual object comprising information about n virtual objects having a genetic relationship with the target virtual object, n being a positive integer; and displaying the information about the n virtual objects, the information about the n virtual objects comprising an image of a virtual object determined by genes of the virtual object based on a genetic inheritance rule. Counter- (Continued)

part apparatus, terminal, server, and non-transitory computer-readable medium embodiments are also contemplated.

20 Claims, 10 Drawing Sheets

(58) Field of Classification Search
USPC .............................................................. 463/1
See application file for complete search history.

(56) References Cited

U.S. PATENT DOCUMENTS

| | | | |
|---|---|---|---|
| 2002/0082077 A1* | 6/2002 | Johnson ................ | A63F 13/69 463/43 |
| 2013/0102379 A1 | 4/2013 | Sargent et al. | |
| 2014/0114630 A1* | 4/2014 | Brave .................... | G06F 30/20 345/420 |

FOREIGN PATENT DOCUMENTS

| | | |
|---|---|---|
| CN | 105825253 A | 8/2016 |
| CN | 107278957 A | 10/2017 |
| CN | 110019918 A | 7/2019 |
| JP | 2002-139987 A | 5/2002 |
| JP | 2003-522569 A | 7/2003 |
| JP | 2017-189476 A | 10/2017 |
| WO | 2014/003115 A1 | 1/2014 |
| WO | 2017/087769 A1 | 5/2017 |

OTHER PUBLICATIONS

Communication dated Oct. 20, 2020, from The China National Intellectual Property Administration in Application No. 201811003685.X.

Written Opinion dated Sep. 30 2019 from the International Bureau in International Application No. PCT/CN2019/096629.

"how novice Baidu Litz dog owns his first pet", Baidu Experience, https://jingyan.baidu.co20180523 S 1-8 UI 1-15 m/article/cb5d6105d3d04f005c2fe095.htm, May 23, 2018 Retrieved Oct. 12, 2020, (12 pages total).

"Counting: Top Ten Cases of 'Block Chain Games'", http://www.100ec.cn/d20180419etail-6445808.html, Apr. 19, 2018, Retrieved Oct. 12, 2020, (9 Pages total).

"How Dogs Breed", Baidu Experience, https://jingyan.baidu.co20180531m/article/ed15cblbadf0a9lbe36981aa.html, May 31, 2018 Retrieved Oct. 12, 2020, (26 Pages total).

Communication dated Feb. 7, 2022 from the Japanese Patent Office in Application No. 2021-517898.

Lee DeoRi cellar killer DApp Cryptoki flaw CryptoKitties:the internet crytocoin website posted writing the rare cat collects, Feb. 24, 2018 (18 pages total).

Cryptoki flaw profit model:the gamete search and internet crytocoin website posted writing it sells, Feb. 28, 2018 (12 pages total).

Office Action issued Dec. 14, 2022 in Korean Application No. 10-2021-7002642.

Communication dated Apr. 19, 2022 from the Japanese Patent Office in Japanese Application No. 2021- 505770.

John Boaz Lee et al., "Higher-order Graph Convolutional Networks", arXiv: 1809.07697v1, Sep. 2018, Retrieved from :<https://arxiv.org/abs/1809.07697v1> (12 pages total).

Masahiro Araki, "Introduction to Machine Learning with Free Software", 2nd Edition, Apr. 2018, pp. 147-148 (10 pages total).

Kazuya Fujita, "Implementation Deep Learning", 1st Edition, Ohmsha, Nov. 2016, pp. 48-56 (16 pages total).

Edited by Tatsuya Kawahara, "Voice Recognition System", Revised 2nd Edition, Ohmsha, Sep. 2016, pp. 63-64 (12 pages total).

* cited by examiner

INFORMATION DISPLAY METHOD AND APPARATUS FOR VIRTUAL OBJECT, TERMINAL, SERVER, AND STORAGE MEDIUM

CROSS-REFERENCE TO RELATED APPLICATION(S)

This application is a bypass continuation application of International Application No. PCT/CN2019/096629, filed on Jul. 19, 2019, which claims priority to Chinese Patent Application No. 201811003685.X, entitled "INFORMATION DISPLAY METHOD, APPARATUS AND DEVICE FOR VIRTUAL PET, AND STORAGE MEDIUM" and filed with the China National Intellectual Property Administration on Aug. 30, 2018, the disclosures of which are herein incorporated by reference in their entireties.

FIELD

Embodiments of the disclosure relate to the field of Internet technologies, and in particular, to an information display method and apparatus for a virtual object, a terminal, a server, and a storage medium.

BACKGROUND

Some game application programs are provided with a function of breeding a virtual pet, to provide more real pet raising experience to a user.

In the related art, a virtual pet raised by a user can give birth to a pet egg, and after the pet egg has been hatched for a period of time, a newly born virtual pet may be generated. In this breeding manner, the virtual pet and its newly born pet have completely the same pet image.

The foregoing virtual pet breeding method provided in the related art has a relatively undiversified product function, which significantly reduces quality of a user experience and accuracy of providing genealogy information of the virtual pet.

SUMMARY

According to an aspect of an example embodiment of the disclosure, provided is an information display method for a virtual object, performed by a terminal on which a virtual object application program is run, the method including:
  obtaining an instruction to display genealogy information corresponding to a target virtual object;
  obtaining the genealogy information of the target virtual object based on the instruction, the genealogy information of the target virtual object including information about n virtual objects having a genetic relationship with the target virtual object, n being a positive integer; and
  displaying the information about the n virtual objects, the information about the n virtual objects including an image of a virtual object determined by genes of the virtual object based on a genetic inheritance rule.

According to an aspect of an example embodiment of the disclosure, provided is an information display method for a virtual object, performed by a server, the method including:
  receiving, from a terminal, a genealogy obtaining request requesting to obtain genealogy information of a target virtual object, the genealogy obtaining request including identification information of the target virtual object;
  forwarding the genealogy obtaining request to the blockchain system;
  receiving the genealogy information of the target virtual object from the blockchain system, the genealogy information of the target virtual object including information about n virtual objects having a genetic relationship with the target virtual object, the information about the n virtual objects including an image of a virtual object determined by genes of the virtual object based on a genetic inheritance rule, and n being a positive integer; and
  transmitting the genealogy information of the target virtual object to the terminal to be displayed.

According to an aspect of an example embodiment of the disclosure, provided is an information display apparatus for a virtual object, applied to a terminal on which a virtual object application program is run, the apparatus including:
  at least one memory configured to store program code; and
  at least one processor configured to read the program code and operate as instructed by the program code, the program code including:
  instruction obtaining code configured to cause at least one of the at least one processor to obtain an instruction to display genealogy information corresponding to a target virtual object;
  genealogy obtaining code configured to cause at least one of the at least one processor to obtain the genealogy information of the target virtual object based on the instruction, the genealogy information of the target virtual object including: information about n virtual objects having a genetic relationship with the target virtual object, n being a positive integer; and
  genealogy display code configured to cause at least one of the at least one processor to display the information about the n virtual objects, the information about the n virtual objects including an image of a virtual object determined by genes of the virtual object based on a genetic inheritance rue.

According to an aspect of an example embodiment of the disclosure, provided is an information display apparatus for a virtual pet, including:
  at least one memory configured to store program code; and
  at least one processor configured to read the program code and operate as instructed by the program code, the program code including:
  first receiving code configured to cause at least one of the at least one processor to receive, from a terminal, a genealogy obtaining request requesting to obtain genealogy information of a target virtual object, the genealogy obtaining request including identification information of the target virtual object;
  forwarding code configured to cause at least one of the at least one processor to forward the genealogy obtaining request to the blockchain system;
  second receiving code configured to cause at least one of the at least one processor to receive the genealogy information of the target virtual object from the blockchain system, the genealogy information of the target virtual object including information about n virtual objects having a genetic relationship with the target virtual object, the information about the n virtual objects including an image of a virtual object determined by genes of the virtual object based on a genetic inheritance rule, and n being a positive integer; and transmitting code configured to cause at least one of the at least one processor to transmit the genealogy information of the target virtual object to the terminal to be displayed.

According to an aspect of an example embodiment of the disclosure, provided is a terminal, including a processor and a memory, the memory storing at least one computer-readable instruction, and the at least one computer-readable instruction being loaded and executed by the processor to perform:

obtaining an instruction to display genealogy information corresponding to a target virtual object;

obtaining the genealogy information of the target virtual object based on the instruction, the genealogy information of the target virtual object including information about n virtual objects having a genetic relationship with the target virtual object, n being a positive integer; and displaying the information about the n virtual objects, the information about the n virtual objects including an image of a virtual object determined by genes of the virtual object based on a genetic inheritance rule.

According to an aspect of an example embodiment of the disclosure, provided is a server, including a processor and a memory, the memory storing at least one computer-readable instruction, and the at least one computer-readable instruction being loaded and executed by the processor to perform:

receiving, from a terminal, a genealogy obtaining request requesting to obtain genealogy information of a target virtual object, the genealogy obtaining request including identification information of the target virtual object;

forwarding the genealogy obtaining request to the blockchain system;

receiving the genealogy information of the target virtual object from the blockchain system, the genealogy information of the target virtual object including information about n virtual objects having a genetic relationship with the target virtual object, the information about the n virtual objects including an image of a virtual object determined by genes of the virtual object based on a genetic inheritance rule, and n being a positive integer; and transmitting the genealogy information of the target virtual object to the terminal to be displayed.

According to an aspect of an example embodiment of the disclosure, provided is a non-transitory computer-readable storage medium, storing at least one computer-readable instruction, the at least one computer-readable instruction being loaded and executed by a processor to perform:

obtaining an instruction to display genealogy information corresponding to a target virtual object;

obtaining the genealogy information of the target virtual object based on the instruction, the genealogy information of the target virtual object including information about n virtual objects having a genetic relationship with the target virtual object, n being a positive integer; and displaying the information about the n virtual objects, the information about the n virtual objects including an image of a virtual object determined by genes of the virtual object based on a genetic inheritance rule.

According to an aspect of an example embodiment of the disclosure, provided is a non-transitory computer-readable storage medium, storing at least one computer-readable instruction, the at least one computer-readable instruction being loaded and executed by a processor to perform:

receiving, from a terminal, a genealogy obtaining request requesting to obtain genealogy information of a target virtual object, the genealogy obtaining request including identification information of the target virtual object;

forwarding the genealogy obtaining request to the blockchain system;

receiving the genealogy information of the target virtual object from the blockchain system, the genealogy information of the target virtual object including information about n virtual objects having a genetic relationship with the target virtual object, the information about the n virtual objects including an image of a virtual object determined by genes of the virtual object based on a genetic inheritance rule, and n being a positive integer; and transmitting the genealogy information of the target virtual object to the terminal to be displayed.

According to an aspect of an example embodiment of the disclosure, provided is a computer program product that is, when executed, configured to perform the method according to one of the foregoing aspects, or perform the method according to another one of the foregoing aspects.

BRIEF DESCRIPTION OF THE DRAWINGS

The following briefly introduces the accompanying drawings for describing some example embodiments. Apparently, the accompanying drawings in the following description show merely some embodiments of the disclosure, and a person of ordinary skill in the technology may still derive other drawings and/or embodiments from the accompanying drawings without creative efforts.

DETAILED DESCRIPTION

Implementations of the disclosure are further described in detail below with reference to the accompanying drawings.

Throughout the disclosure, the expression such as "at least one of a, b, and c" or "at least one of a, b or c" indicates only a, only b, only c, both a and b, both a and c, both b and c, all of a, b, and c, or any combinations or variations thereof.

Figure 1:
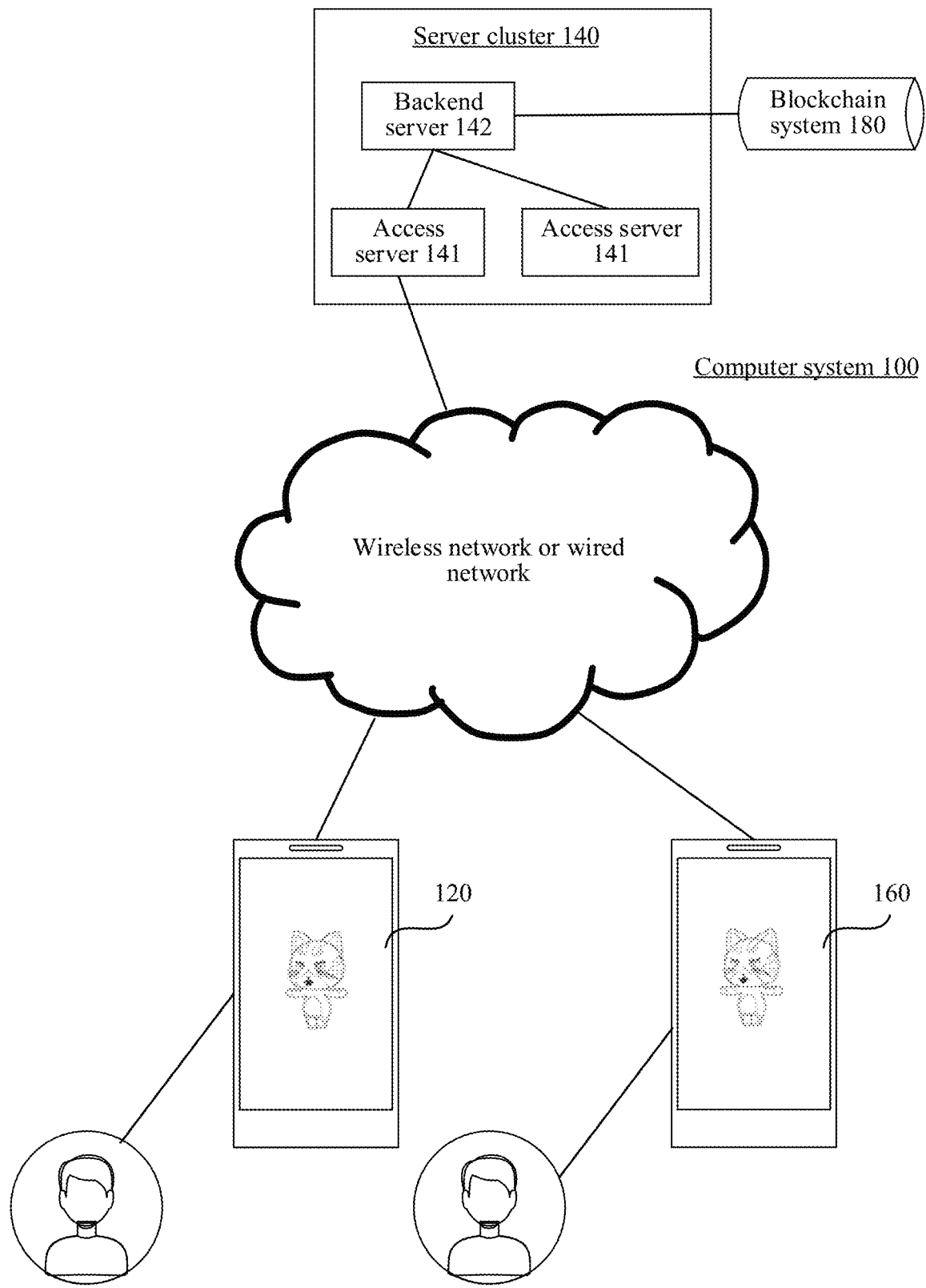
FIG. 1 is a structural block diagram of a computer system according to an embodiment of the disclosure.

FIG. 1 is a structural block diagram of a computer system 100 according to an embodiment of the disclosure. The computer system 100 may include: a first terminal 120, a server cluster 140 and a second terminal 160.

The first terminal 120 is connected to the server cluster 140 by using a wireless network or wired network. The first terminal 120 may be at least one of a smartphone, a game console, a desktop computer, a tablet computer, an e-book reader, a multimedia playback device and a laptop portable computer. An application program supporting a user involvement with a virtual object (e.g., a virtual pet, cattle, or animal) is installed and run on the first terminal 120. The application program may be referred to as "a virtual object application program," and other terms and parts of the apparatuses, systems, devices, terminals, servers, methods, and non-transitory computer-readable medium described in this disclosure may also adopt a similar naming convention. The first terminal 120 is a terminal used by a first user, and a first user account logs in to the application program in the first terminal 120.

The server cluster 140 includes at least one of one server, a plurality of servers, a cloud computing platform and a virtualization center. The server cluster 140 is configured to provide a backend service for the application program supporting a virtual object (e.g., a virtual pet, cattle, or animal). Herein, as an example, an application program supporting a virtual pet is described. However, it should be understood that, in some embodiments, the apparatuses, systems, devices, terminals, servers, methods, and non-transitory computer-readable medium described in this disclosure may also apply to other virtual objects that are collectible or can be owned by a person, such as a virtual vehicle, a virtual baseball card, a virtual stamp, a virtual wine, and other virtual items. Optionally, the server cluster 140 is responsible for primary computing work, and the first terminal 120 and the second terminal 160 are responsible for secondary computing work; or the server cluster 140 is responsible for secondary computing work, and the first terminal 120 and the second terminal 160 are responsible for primary computing work; or the server cluster 140, the first terminal 120 and the second terminal 160 perform collaborative computing by using a distributed computing architecture among each other.

Optionally, the server cluster 140 includes: an access server 141 and a backend server 142. The access server 141 is configured to provide an access service and an information receiving/transmitting service for the first terminal 120 and the second terminal 160, and forward useful information between a terminal and the backend server 142. The backend server 142 is configured to provide the backend service for the application program, such as, at least one of a game logic service, a material providing service, a virtual pet generating service, a virtual pet trading service, and a virtual pet breeding service. There may be one or more backend servers 142. When there are a plurality of backend servers 142, there are at least two backend servers 142 configured to provide different services, and/or there are at least two backend servers 142 configured to provide the same service. This is not limited in an embodiment of the disclosure.

An application program supporting a virtual pet is installed and run on the second terminal 160. The second terminal 160 is a terminal used by a second user. A second user account logs in to the application program in the second terminal 160.

Optionally, the first user account and the second user account are in the same virtual social network. Optionally, the first user account and the second user account may belong to the same team or the same organization, have a friend relationship or have temporary communication permission. Optionally, the first user account and the second user account may alternatively belong to different teams, different organizations, or two hostile groups.

Optionally, the application programs installed on the first terminal 120 and the second terminal 160 are the same, or the application programs installed on the two terminals are the same type of application programs on different control system platforms. The first terminal 120 may generally refer to one of a plurality of terminals, the second terminal 160 may generally refer to one of a plurality of terminals, and an embodiment is described only by using the first terminal 120 and the second terminal 160 as an example. The terminal types of the first terminal 120 and the second terminal 160 are the same or different. The following embodiments are described by using an example in which the first terminal 120 and/or the second terminal 160 is a smartphone.

A person skilled in the art would understand that there may be more or fewer terminals. For example, there may be only one terminal, or there may be dozens of, hundreds of, or more terminals connected to the server cluster 140. The quantity or device type of the terminals is not limited in an embodiment of the disclosure.

Figure 2:
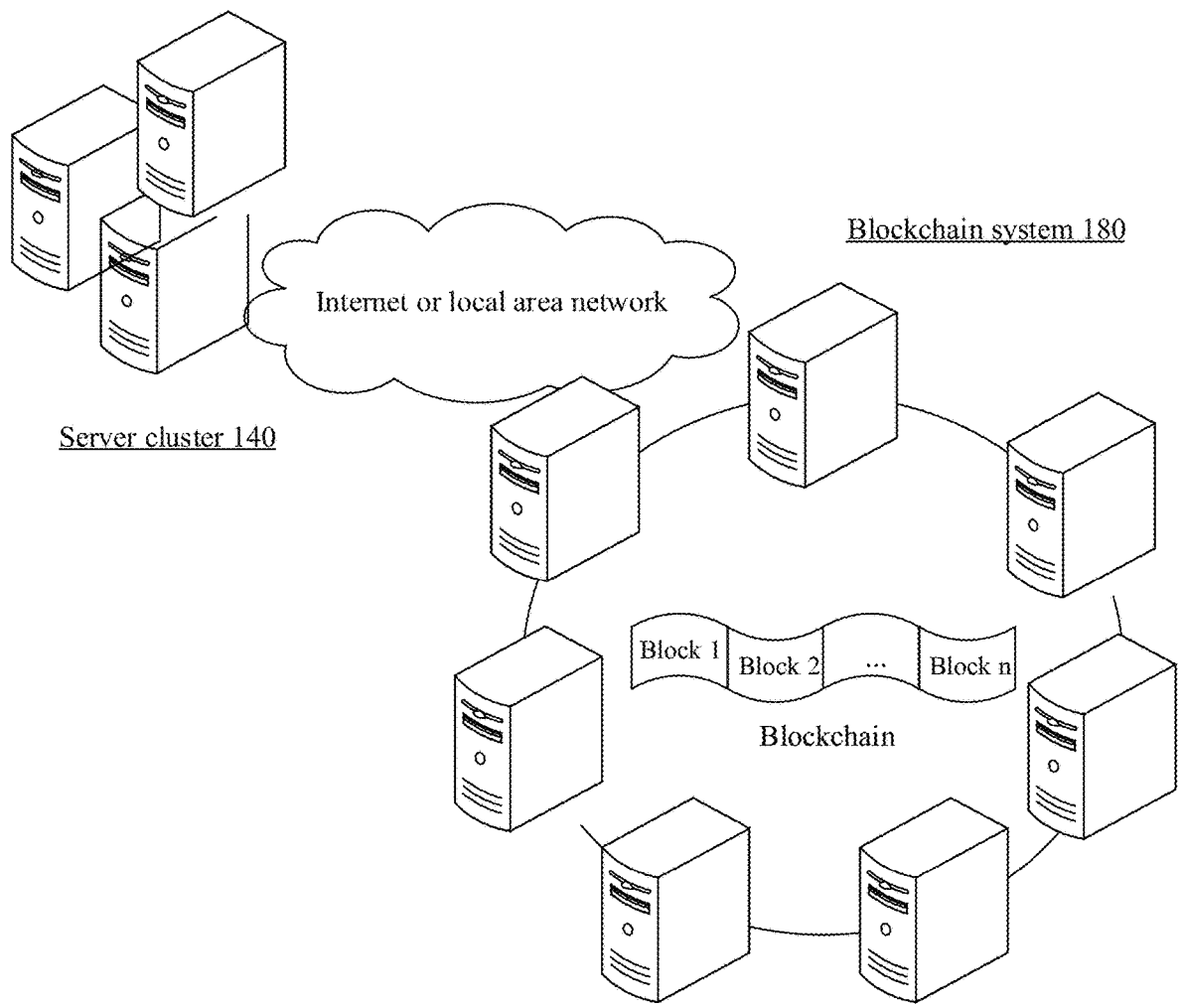
FIG. 2 is a structural block diagram of a computer system according to another embodiment of the disclosure.

In some optional embodiments, the server cluster 140 is configured to store information about each virtual pet, such as role information, genealogy information, and trading record. The role information includes: at least one of a role identifier (for example, name) used for uniquely identifying the virtual pet, an image parameter used for representing a pet image of the virtual pet, and a preview used for representing the virtual pet. In some optional embodiments, as shown in FIG. 1 or FIG. 2, there is further a communication connection between the server cluster 140 and a blockchain system 180, and the server cluster 140 stores the information about each virtual pet in the blockchain system 180. In some optional embodiments, the server cluster 140 itself may alternatively be used as one node in the blockchain system 180 to run and store data.

Terms that are used to describe embodiments of the disclosure are first described.

Virtual pet: a digital pet presented as at least one of pet images in a cartoon form and an animal form. The virtual pet is a two-dimensional digital pet or a three-dimensional digital pet. For example, a virtual pet is a three-dimensional virtual pet presented as a pet image in the form of a cartoon cat. Optionally, there are some virtual pets whose pet images are generated randomly. For example, pet images of the first-generation virtual pets are generated randomly. There are some virtual pets whose pet images are generated based on a genetic inheritance rule according to pet images of parental virtual pets and/or other ancestral virtual pets. For example, a pet image of a descendant virtual pet other than the first-generation virtual pet is generated based on the genetic inheritance rule. Optionally, each virtual pet has a unique gene sequence, and the gene sequence includes generation parameters for determining a pet image of the virtual pet. The gene sequence is also referred to as image parameters.

In some embodiments, pet information of each virtual pet is stored on a blockchain system, and is stored and authenticated through a consensus mechanism for a plurality of nodes on the blockchain system. The pet information at least includes: a unique gene sequence of the virtual pet, and further optionally includes: at least one of identification information of the virtual pet, parent information of the virtual pet, generation information of the virtual pet, genealogy information of the virtual pet, historical transaction journal information of the virtual pet, event journal information of the virtual pet and other information about the virtual pet. Because a gene sequence of each virtual pet is unique and information stored on a blockchain system is true and unique, a virtual pet has a collection attribute. Meanwhile, because pet information of a virtual pet is stored on a blockchain system, even if a virtual pet is a digital pet designed to be used in a first application program, the virtual pet may be conveniently migrated to a second application program and used. The first application program and the second application program are different application programs.

In some embodiments, a virtual pet is a digital pet displayed by an application program running on a terminal. The application program includes at least one of the following functions: capturing a virtual pet, generating a virtual pet, breeding a virtual pet, trading a virtual pet, fighting by using a virtual pet, carrying out augmented reality (AR) interaction by using a virtual pet, carrying out social communication by using a virtual pet, and carrying out AR education by using a virtual pet. In some other embodiments, the application program is an application program for obtaining, breeding and/or trading a virtual pet based on a blockchain system. In some other embodiments, the application program is a geolocation-based social game program and the social game program provides at least one function of performing collection, growing, and/or fighting by using a virtual pet.

In some embodiments, a gene sequence determines features of a virtual pet. The above-mentioned features may include: extrinsic features and/or intrinsic features.

Extrinsic features refer to features embodying a pet image of a virtual pet. Optionally, a virtual pet may include different body parts such as skin, speckles, ears, beards, patterns, eyes, and a mouth, and each of the body parts may have a variety of different extrinsic features. The extrinsic features may include visible features such as color, shape, texture and the like. For example, extrinsic features of skin may include different colors of white skin, red skin, orange skin, yellow skin, green skin, cyan skin, blue skin, purple skin and the like. For another example, extrinsic features of ears may include different shapes of long ears, short ears, rolled ears, folded ears, normal ears and the like.

Intrinsic features refer to features embodying intrinsic properties of a virtual pet. For example, intrinsic properties may include a variety of different properties such as an intelligence value, an attack power value, a defense power value, a dexterity value, a magic value, a strength value, an endurance value, an agility value, a potential value, a speed value, a health point and the like.

A gene sequence of a virtual pet: includes a set of parameter values used for generating a pet image of the virtual pet, and is also referred to as image parameters. Taking the virtual pet being a 3D virtual pet as an example, the pet image of each virtual pet includes a plurality of types of 3D image materials. The types of 3D image materials correspond to different role parts and/or texture levels. Each 3D image material corresponds to a material identifier. Each type of 3D material identifier may be considered as a parameter value in the gene sequence. For example, if 3D body models of a 3D virtual pet are the same, the pet image of the 3D virtual pet includes at least 8 types of 3D image materials (also referred to as local feature): 3D body model, ear model, skin material, eye material, nose material, mouth material, beard material, body speckle material, and chest and abdomen pattern material. Optionally, the pet image of the 3D virtual pet further optionally includes: a tail material, an external pendant material, and a global feature. The tail material is a feature for determining a tail model of the virtual pet. For example, when the pet image is an animal type, the tail material is a long and thin tail or a short and thick tail. The external pendant material is a feature for determining accessories of the virtual pet. The accessories include but are not limited to at least one of a backpack, glasses, handheld prop, belt, clothes, hat, shoes and head accessory. The global feature is an overall image feature for covering the body model of the virtual pet, and has the highest display priority. When target image parameters include the global feature, the global feature covers the local feature and is completely displayed, that is, the local feature is hidden and not displayed. For example, when a pet cat has a global feature "A", an image corresponding to the global feature "A" is displayed instead of an image of the pet cat based on the local feature.

Accordingly, the gene sequence includes at least one of a global feature parameter, a skin texture feature parameter, a skin color feature parameter, a belly texture feature parameter, a belly color feature parameter, an eye texture feature parameter, an eye color feature parameter, a mouth texture feature parameter, a mouth color feature parameter, a beard texture feature parameter, a beard color feature parameter, an ear feature parameter, a tail feature parameter, and a pendant feature parameter. The gene sequence may be represented by a plurality of key-value pairs arranged in order, and the key-value pairs may be in the form of (gene name, parameter value). In a representative example, the gene sequence is represented as Gene=[(3D body model feature, default), (skin feature, smooth), (belly feature, pattern 1), (mouth texture feature, small canine teeth 1), (mouth color feature, red), (tail feature, stubby shape)].

A genetic inheritance rule: also referred to as a genetic rule, genetic algorithm, or genetic inheritance algorithm, is a rule of handing down pet images of parental virtual pets and/or other ancestral virtual pets by imitating a genetic law of real creatures to generate a pet image of a filial virtual pet. In some embodiments, to ensure that each virtual pet is a unique customized virtual pet, each virtual pet has a unique gene sequence. In some embodiments, the genetic inheritance rule is a rule of recombining and deduplicating pet images of parental virtual pets and/or other ancestral virtual pets according to the genetic law to generate a pet image with a unique feature of a filial virtual pet. Deduplication refers to a mechanism of regenerating, when the same gene sequence as that of an existing virtual pet appears in a genetic process, a gene sequence of the virtual pet thereby ensuring genetic uniqueness of the virtual pet. Optionally, because the genetic inheritance rule imitates the genetic rule of real creatures, there are further restrictions in the breeding process, such as duration of pregnancy and forbidding breeding of close relatives.

In an embodiment of the disclosure, there are genetic genes between two virtual pets with a genetic relationship. Genetic genes refer to genes handed down from one of two virtual pets with a genetic relationship to the other. Features determined by genetic genes may be referred to as genetic features. Two virtual pets with a genetic relationship have same genetic features, that is, have same image material features. For example, two virtual pets with a genetic relationship both have yellow skin. For another example, two virtual pets with a genetic relationship both have red skin and folded ears. There may be one or more genetic features, which is not limited in an embodiment of the disclosure. Typically, the closer the generations between two virtual pets with a genetic relationship are, the more genetic features there are; conversely, the farther the generations between two virtual pets with a genetic relationship are, the fewer genetic features there are.

Generation information of a virtual pet: refers to generation information of the virtual pet in the entire virtual pet world (or an entire virtual pet system), which is determined by generations of a paternal virtual pet and a maternal virtual pet of the virtual pet. In some embodiments, the generation of a filial virtual pet is obtained by adding one to the maximum generation number of the paternal virtual pet and the maternal virtual pet. For example, if the paternal virtual pet is a $0^{th}$-generation virtual pet and the maternal virtual pet is a $4^{th}$-generation virtual pet, the filial virtual pet is a $5^{th}$-generation virtual pet. In some embodiments, the generation of a first-generation virtual pet is the lowest. For example, the generation of the first-generation virtual pet is 0. The generation of a non-first-generation virtual pet is determined by generations of the parental virtual pets thereof. The generation of the filial virtual pet bred and generated by the parental virtual pets is higher than those of the parental virtual pets thereof. In an example, if only parental virtual pets of the same generation are allowed to breed and generate a filial virtual pet (that is, next-generation virtual pet), the generation of the filial virtual pet is equal to the generation of the parental virtual pets plus one. For example, if the generations of the parental virtual pets are both 1, the generation of the filial virtual pet is 2. For another example, if the generations of the parental virtual pets are both 0, the generation of the filial virtual pet is 1. In another example, if not only parental virtual pets of the same generation are allowed to breed and generate a filial virtual pet (that is, next-generation virtual pet), but also parental virtual pets of different generations are allowed to breed and generate a filial virtual pet, the generation of the filial virtual pet is equal to the generation of one of parental virtual pets with the higher generation plus one. For example, when the generation of the paternal virtual pet is 0 and the generation of the maternal virtual pet is 2, the generation of the filial virtual pet is 3. In addition, the first-generation virtual pet is not bred or generated by the paternal virtual pet and the maternal virtual pet, but is automatically generated by a virtual pet system. Therefore, the first-generation virtual pet does not have a paternal virtual pet or a maternal virtual pet, and there are no other virtual pets that have higher generations than that of the first-generation virtual pet and that have a genetic relationship with the first-generation virtual pet.

In an embodiment of the disclosure, a mechanism of breeding and generating a virtual pet based on a genetic inheritance rule is provided. Under this mechanism, genes of parental virtual pets are handed, through simulation, down to a next generation based on the genetic inheritance rule, and a pet image of a virtual pet is determined by genetic genes obtained by the virtual pet from the parental virtual pets. Therefore, the breeding manner according to an example embodiment is closer to biological breeding in the real world, so that product functions are more real and diversified.

Moreover, an embodiment of the disclosure further provides a genealogy display function of a virtual pet, to display genealogy information of the virtual pet, so that a user understands, according to the genealogy information of the virtual pet, an image of an elder pet (or ancestor pet) having a genetic relationship with the virtual pet, and then learns ancestry information of the virtual pet, thereby providing more useful information for value prediction of the virtual pet in a breeding market and a trading market, to further enrich product functions.

Figure 3:
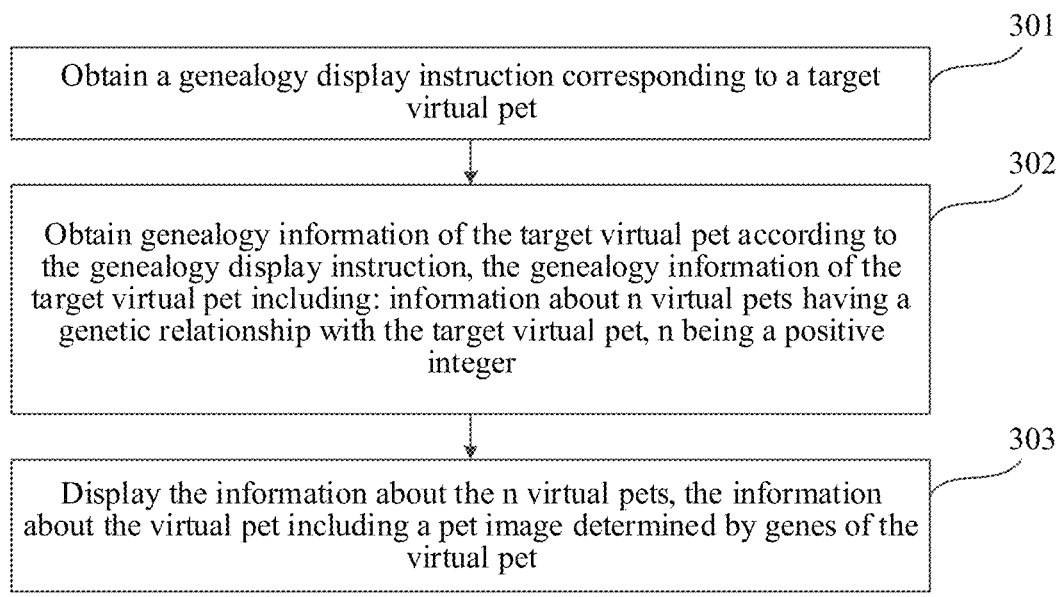
FIG. 3 is a flowchart of an information display method for a virtual pet according to an embodiment of the disclosure.

FIG. 3 is a flowchart of an information display method for a virtual pet according to an embodiment of the disclosure. The method may be applied to a terminal, such as the foregoing first terminal or second terminal. The method may include the following several operations 301-303:

Operation 301. Obtain a genealogy display instruction corresponding to a target virtual pet.

The genealogy display instruction refers to an instruction used for triggering display of genealogy information. The genealogy display instruction corresponding to the target virtual pet is an instruction used for triggering display of the genealogy information of the target virtual pet.

In an embodiment of the disclosure, the target virtual pet may be any virtual pet in an application program. The target virtual pet may be a virtual pet owned by a current user account logging in to the application program of the terminal, or may be a virtual pet owned by another user account, or may be a virtual pet not owned by any user account, for example, a virtual pet not captured by any user account, or a virtual pet not purchased by any user account in a pet store.

In an embodiment of the disclosure, the genealogy display instruction is not limited in form, and may be, for example, an instruction in any form such as a touch operation, voice, or a gesture. Taking the form of the touch operation as an example, the terminal may display a detail interface of the target virtual pet used for displaying detail information of the target virtual pet. The detail information includes but is not limited to at least one of the following: name, generation, attribute and so on. In an example, the detail interface of the target virtual pet includes a genealogy display control, which is an operation control used for triggering the genealogy display instruction, such as a button or a slider. When the terminal obtains an operation signal corresponding to the genealogy display control, the genealogy display instruction corresponding to the target virtual pet is obtained. The foregoing operation signal may be tapping, pressing, slide or another operation signal, which is not limited in an embodiment of the disclosure. In another example, when the terminal obtains the slide operation signal corresponding to the detail interface of the target virtual pet, the genealogy display instruction corresponding to the target virtual pet is obtained. A direction of the foregoing slide operation signal may be any one of an upward direction, a downward direction, a leftward direction and a rightward direction. Taking the direction of the slide operation signal being upward as an example, the function of pulling up the detail interface of the target virtual pet to trigger display of the genealogy information of the target virtual pet may be realized.

Operation 302. Obtain genealogy information of the target virtual pet according to the genealogy display instruction, the genealogy information of the target virtual pet including: information about n virtual pets having a genetic relationship with the target virtual pet, n being a positive integer.

In an embodiment of the disclosure, a virtual pet is generated based on a genetic inheritance rule. One paternal virtual pet and one maternal virtual pet may breed and generate one or more filial virtual pets. Each filial virtual pet inherits some genes of the paternal virtual pet and some genes of the maternal virtual pet. In an embodiment of the disclosure, genetic relationships include a direct genetic relationship and an indirect genetic relationship. The direct genetic relationship refers to a genetic relationship between two adjacent generations, that is, a genetic relationship between a parent and a child thereof. The indirect genetic relationship refers to a genetic relationship between two generations spaced apart by at least one generation, such as a genetic relationship between a grandparent and a grandson or granddaughter thereof, or a genetic relationship between a great-grandparent and a great-grandson or great-granddaughter thereof.

Figure 4:
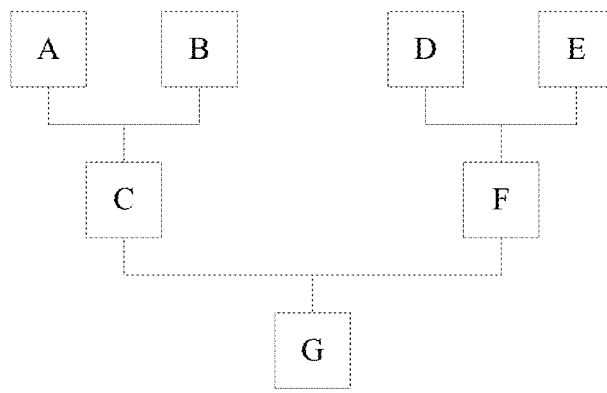
FIG. 4 is an example genealogy relationship diagram.

FIG. 4 is a genealogy relationship diagram. A virtual pet A and a virtual pet B breed and generate a virtual pet C, a virtual pet D and a virtual pet E breed and generate a virtual pet F, and the virtual pet C and the virtual pet F breed and generate a virtual pet G. Therefore, there is a genetic relationship between the virtual pet C and each of the virtual pet A, the virtual pet B and the virtual pet G, there is a genetic relationship between the virtual pet F and each of the virtual pet D, the virtual pet E and the virtual pet G, and there is a genetic relationship between the virtual pet G and each of the virtual pet C, the virtual pet F, the virtual pet A, the virtual pet B, the virtual pet D and the virtual pet E.

In an example of the disclosure, n virtual pets contained in genealogy information of a target virtual pet only include another virtual pet that has a genetic relationship with the target virtual pet and whose generation is higher than that of the target virtual pet. For example, as shown in FIG. 4, assuming that the target virtual pet is the virtual pet C, genealogy information of the virtual pet C only includes the virtual pet A and the virtual pet B.

In another example of the disclosure, n virtual pets contained in genealogy information of a target virtual pet only include another virtual pet that has a genetic relationship with the target virtual pet and whose generation is lower than that of the target virtual pet. For example, as shown in FIG. 4, assuming that the target virtual pet is the virtual pet C, genealogy information of the virtual pet C only includes the virtual pet G.

In still another example of the disclosure, n virtual pets contained in genealogy information of a target virtual pet not only include another virtual pet that has a genetic relationship with the target virtual pet and whose generation is higher than that of the target virtual pet, but also include another virtual pet that has a genetic relationship with the target virtual pet and whose generation is lower than that of the target virtual pet. For example, as shown in FIG. 4, assuming that the target virtual pet is the virtual pet C, genealogy information of the virtual pet C includes the virtual pet A, the virtual pet B and virtual pet G.

In an embodiment of the disclosure, there are genetic genes between two virtual pets with a genetic relationship. Genetic genes refer to genes handed down from one of two virtual pets with a genetic relationship to the other. Features determined by genetic genes may be referred to as genetic features. Two virtual pets with a genetic relationship have same genetic features, that is, have same image material features. For example, two virtual pets with a genetic relationship both have yellow skin. For another example, two virtual pets with a genetic relationship both have red skin and folded ears. There may be one or more genetic features, which is not limited in an embodiment of the disclosure. Typically, the closer the generations between two virtual pets with a genetic relationship are, the more genetic features there are; conversely, the farther the generations between two virtual pets with a genetic relationship are, the fewer genetic features there are.

Optionally, in some embodiments, virtual pets may be further classified according to extrinsic features of the virtual pets. For example, virtual pets are classified according to quality of extrinsic features of the virtual pets, and different types of virtual pets have extrinsic features of different quality levels. The quantity of quality levels may be preset. For example, quality levels include a high-quality level and an ordinary level. For another example, quality levels include a high level, an intermediate level, and a low level. Each quality level corresponds to one type. The n virtual pets obtained in operation 302 may be virtual pets that have a genetic relationship with the target virtual pet and that belong to a particular type. For example, virtual pets are classified into w different types, w is a positive integer greater than 1, and the foregoing particular type may be one of the w different types, or may be at least two of the w different types.

In an example, when virtual pets are classified according to quality of extrinsic features of the virtual pets, the particular type refers to a type of a virtual pet having high-quality extrinsic features. Optionally, the high-quality extrinsic features include an extrinsic feature having an occurrence probability less than a preset probability and/or an extrinsic feature having a feature level higher than a preset level, where the extrinsic feature having an occurrence probability less than the preset probability may be referred to as a rare feature, referring to an extrinsic feature occurring with a small probability in an entire virtual pet system; and the extrinsic feature having a feature level higher than the preset level may be referred to as a global feature, referring to a feature affecting an overall pet image of a virtual pet. The level of the global feature is higher than the level of a local feature, and the local feature refers to a feature affecting a local image of the virtual pet, such as a skin feature, a belly feature, or an eye feature. For example, when types of virtual pets include a high-quality type and an ordinary type, the particular type may be the high-quality type. For another example, when types of virtual pets include a high-quality type, an intermediate-quality type and a low-quality type, the particular type may be the high-quality type.

Moreover, information about a virtual pet contained in genealogy information may include a pet image of the virtual pet determined by genes of the virtual pet. A pet image of a virtual pet may be a 3D image or a 2D image. Optionally, information about a virtual pet further includes the name and/or generation of the virtual pet.

Operation 303. Display the information about the n virtual pets, the information about the virtual pet including a pet image determined by genes of the virtual pet.

The terminal displays the information about the n virtual pets included in the genealogy information after obtaining the genealogy information of the target virtual pet. In an example, an array of a plurality of pieces of information respectively corresponding to the n virtual objects may be displayed.

In an example, the terminal displays the information about the n virtual pets in the form of cards. Optionally, the terminal displays respective corresponding cards of the n virtual pets. Optionally, the cards are arranged in an array form. For example, the cards are arranged in the array form of M×N, where M represents the quantity of columns, N represents the quantity of rows, and M and N are positive integers. For example, a card corresponding to an $i^{th}$ virtual pet of the n virtual pets includes information about the $i^{th}$ virtual pet, i being a positive integer less than or equal to n.

Optionally, the terminal displays the genealogy information of the target virtual pet in the detail interface of the target virtual pet; or the terminal may display a genealogy interface of the target virtual pet, and display the genealogy information of the target virtual pet in the genealogy interface of the target virtual pet.

Figure 5:
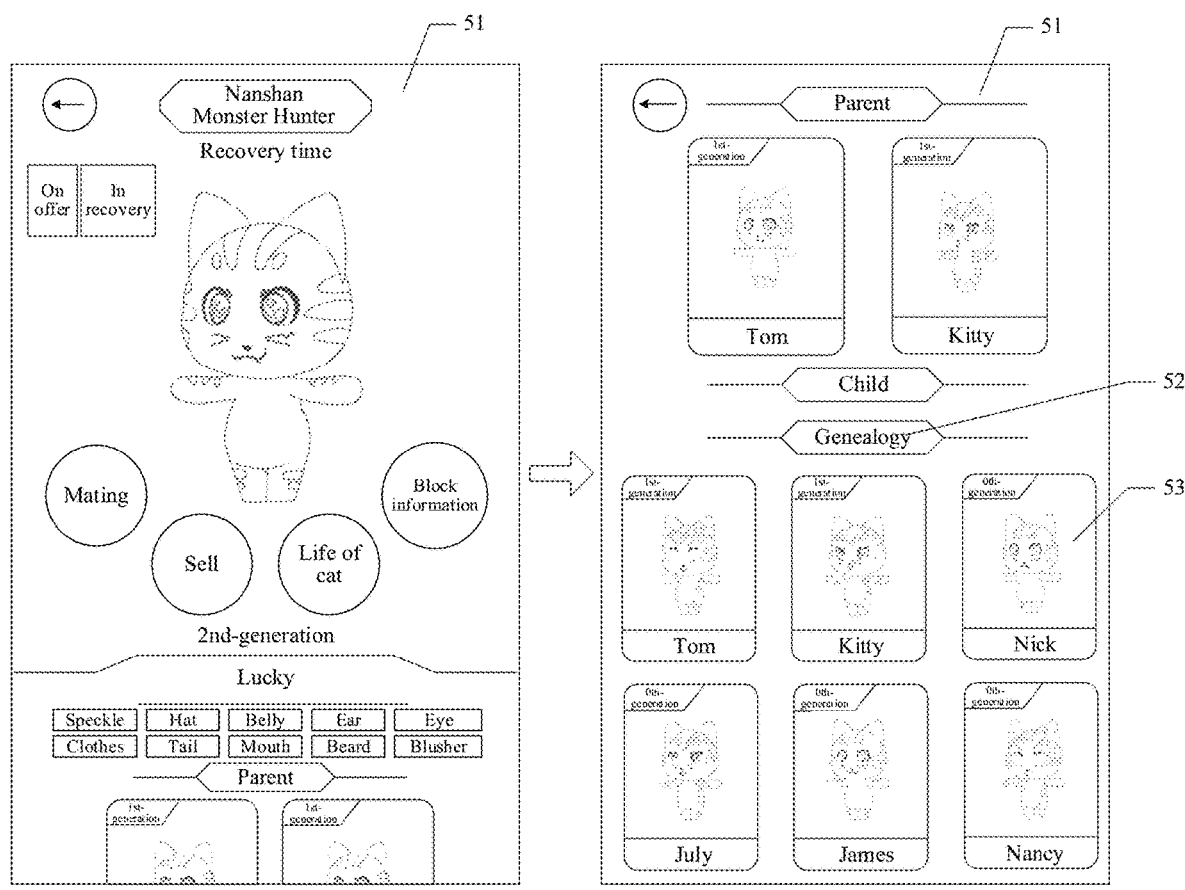
FIG. 5 is an example schematic diagram of an interface that displays genealogy information of a virtual pet.

FIG. 5 is an example schematic diagram of an interface that displays genealogy information of a virtual pet. Taking a virtual pet cat as an example, a terminal displays a detail interface 51 of the virtual pet cat "Lucky". A user executes an upward slide operation signal acting on the detail interface 51, and the terminal displays genealogy information 52 of the virtual pet cat "Lucky" in the detail interface 51. The genealogy information 52 of the virtual pet cat "Lucky" contains several cards 53, and each card 53 displays information about one virtual pet cat having a genetic relationship with the virtual pet cat "Lucky", the information including pet image, name, generation, and other information.

To sum up, in the technical solutions provided in an embodiment of the disclosure, a mechanism of breeding and generating a virtual pet based on a genetic inheritance rule is provided. Under this mechanism, genes of parental virtual pets are handed, through simulation, down to a next generation based on the genetic inheritance rule, and a pet image of a virtual pet is determined by genetic genes obtained by the virtual pet from the parental virtual pets. Therefore, the breeding manner according to an example embodiment is closer to biological breeding in the real world, so that product functions are more real and diversified.

Moreover, an embodiment of the disclosure further provides a genealogy display function of a virtual pet, to display genealogy information of the virtual pet, so that a user understands, according to the genealogy information of the virtual pet, an image of an elder pet (or an ancestor pet) having a genetic relationship with the virtual pet, and then learns ancestry information of the virtual pet, thereby providing more useful information for value prediction of the virtual pet in a breeding market and a trading market, to further enrich product functions.

Figure 6:
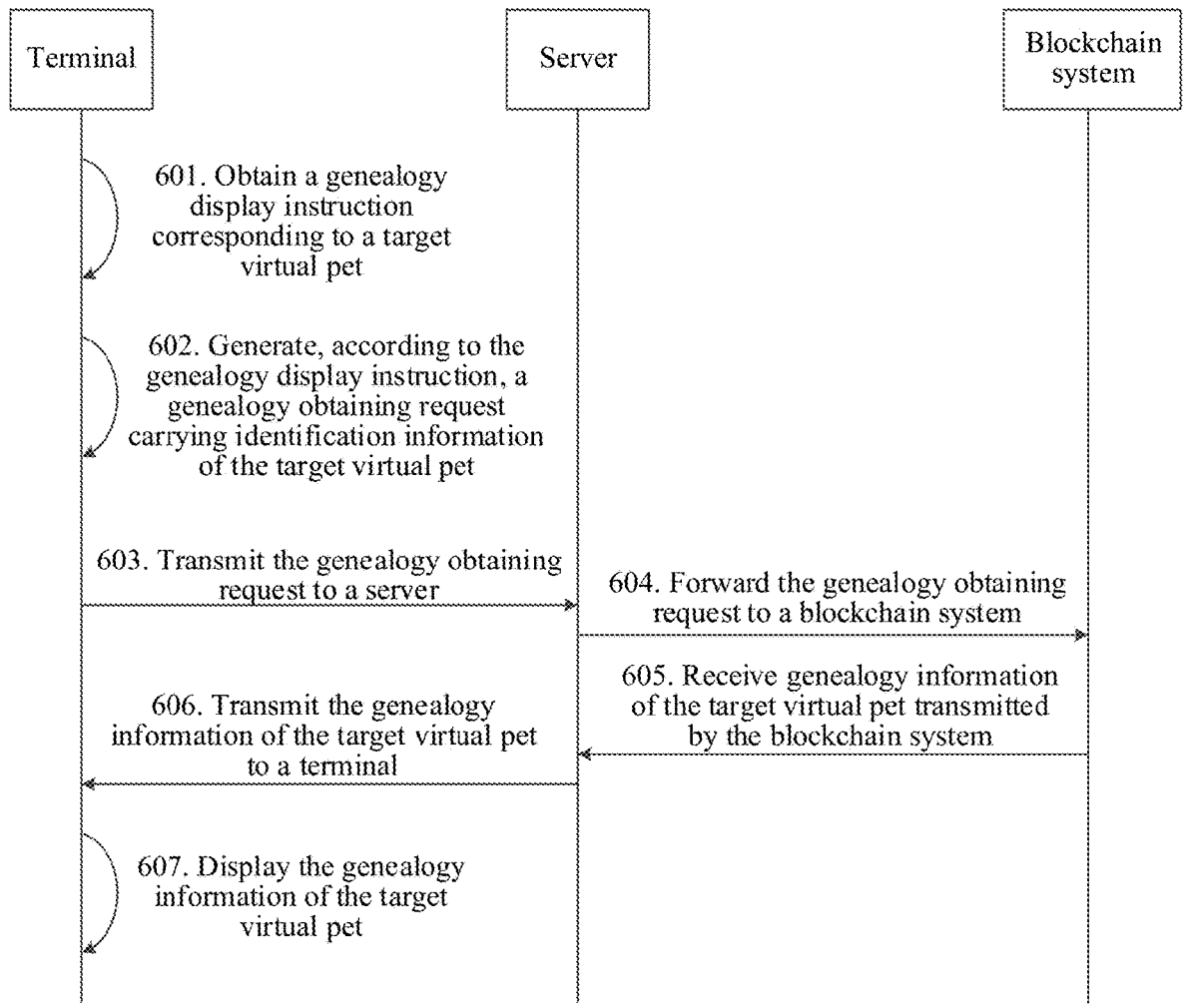
FIG. 6 is a flowchart of an information display method for a virtual pet according to another embodiment of the disclosure.

FIG. 6 is a flowchart of an information display method for a virtual pet provided by another embodiment of the disclosure. The method may be applied to the system architecture shown in FIG. 1. The method may include the following several operations 601-607:

Operation 601. A terminal obtains a genealogy display instruction corresponding to a target virtual pet.

Operation 602. The terminal generates, according to the genealogy display instruction, a genealogy obtaining request carrying identification information of the target virtual pet.

The identification information of the target virtual pet is used for uniquely indicating the target virtual pet. Each virtual pet has its own identification information, and different virtual pets have different identification information. The identification information of the virtual pet may be a character string, and the character string may be formed by at least one element of numbers, letters, and symbols.

The genealogy obtaining request is used for requesting to obtain genealogy information of the target virtual pet.

Operation 603. The terminal transmits the genealogy obtaining request to a server.

Operation 604. The server forwards the genealogy obtaining request to a blockchain system.

The server obtains, after receiving the genealogy obtaining request transmitted by the terminal, the genealogy information of the target virtual pet according to the identification information of the target virtual pet carried in the genealogy obtaining request. In an embodiment of the disclosure, the genealogy information of the virtual pet is stored in the blockchain system, and the server may obtain the genealogy information of the target virtual pet from the blockchain system.

The blockchain system refers to a system that stores data by using a blockchain technology. The blockchain technology is also referred to as a distributed ledger technology, which is an Internet database technology and features decentralization, openness and transparency, enabling all users to participate in database record. The blockchain technology may be a distributed infrastructure and computing method that verifies and stores data by using a blockchain data structure, generates and updates data by using a distributed node consensus algorithm, ensures the security of data transmission and access by using a method of cryptology, and programs and operates data by using a smart contract formed by automation script code. The data stored in the blockchain system has very high stability and reliability, and the blockchain system is a database that cannot be tampered with and is reliable. Therefore, compared with storing the genealogy information of the virtual pet in the related art by directly using a backend server of an application program, storing the genealogy information of the virtual pet by using the blockchain system is conducive to improving the security and reliability of the genealogy information. Moreover, because a virtual pet is generated based on a genetic inheritance rule, genealogy information of the virtual pet reflects a genetic feature of the virtual pet to some extent. A virtual pet having high-quality genes and high-quality features has relatively high value in a trading market, and therefore securely storing genealogy information of the virtual pet by using the blockchain system may fully ensure stability and reliability of the value of the virtual pet.

Optionally, before the server forwards the genealogy obtaining request to the blockchain system, the following operations are further performed:

1. Detect whether the genealogy obtaining request meets a first response condition, where
   the first response condition includes but is not limited to at least one of the following: a user account logging in to the terminal has activated a virtual pet system, the virtual pet system is in an enabled state, and the target virtual pet is not a first-generation virtual pet.

The virtual pet system may be activated only if the user account meets an activation condition. The foregoing activation condition may include at least one of conditions that the user account reaches a specified level, the user account is granted a specified function or permission, and recharging of the user account reaches a specified amount. In an example, when the user account reaches a level 15, the virtual pet system is activated, functions provided by the virtual pet system, such as a virtual pet obtaining function, a virtual pet breeding function, and a virtual pet trading function may be used.

The virtual pet system may switch between an enabled state and a disabled state, and when an enabling condition is met, the virtual pet system is enabled. The foregoing enabling condition may include at least one of the following: belonging to a particular period of time, completing a specified task, and reaching a specified accomplishment. In an example, the virtual pet system is in the enabled state between 16:00 and 22:00 every day, and is in the disabled state in the remaining period of time.

The first-generation virtual pet refers to a virtual pet whose generation is 0, and the first-generation virtual pet is not bred or generated by the paternal virtual pet and the maternal virtual pet, but is automatically generated by the virtual pet system. Therefore, the first-generation virtual pet does not have a paternal virtual pet or a maternal virtual pet, and there are no other virtual pets that have higher generations than that of the first-generation virtual pet and that have a genetic relationship with the first-generation virtual pet.

2. Perform operation 604 in a case that the genealogy obtaining request meets the first response condition.

3. In a case that the genealogy obtaining request does not meet the first response condition, end the process, or the server transmits a request failure response to the terminal.

Through the foregoing manner, the server determines whether the genealogy obtaining request meets the first response condition, and only if the genealogy obtaining request meets the first response condition, the server forwards the genealogy obtaining request to the blockchain system, to determine validity of the genealogy obtaining request at the server end, thereby avoiding a case in which an invalid request reaches the blockchain system and causes unnecessary processing overheads of the blockchain system.

Operation 605. The server receives the genealogy information of the target virtual pet transmitted by the blockchain system.

After receiving the genealogy obtaining request forwarded by the server, the blockchain system obtains, according to the identification information of the target virtual pet carried in the genealogy obtaining request, from genealogy information of all virtual pets stored in the blockchain system, the genealogy information stored corresponding to the identification information of the target virtual pet as the genealogy information of the target virtual pet and transmits the genealogy information to the server.

The genealogy information of the target virtual pet transmitted by the blockchain system to the server includes information about n virtual pets having a genetic relationship with the target virtual pet, n being a positive integer. The explanation and description of the genetic relationship may refer to the foregoing embodiment. Details are not described herein again.

Operation 606. The server transmits the genealogy information of the target virtual pet to the terminal.

Operation 607. The terminal displays the genealogy information of the target virtual pet.

The content contained in the genealogy information and the display method for the genealogy information may refer to the foregoing embodiment. Details are not described herein again.

Based on the above, in the technical solutions provided by an embodiment of the disclosure, the genealogy information of the virtual pet is further stored by using the blockchain system, thereby fully ensuring the security and reliability of the genealogy information of the virtual pet.

Moreover, because a virtual pet is generated based on a genetic inheritance rule, genealogy information of the virtual pet reflects a genetic feature of the virtual pet to some extent. A virtual pet having high-quality genes and high-quality features has relatively high value in a trading market, and therefore securely storing genealogy information of the virtual pet by using the blockchain system may fully ensure stability and reliability of the value of the virtual pet.

In the above embodiment of FIG. 6, a method for requesting, by a terminal, to obtain genealogy information of a virtual pet when the genealogy information is stored by using a blockchain system is introduced. The following describes a storage process of genealogy information of a virtual pet. The storage process may include operations 1-8 that are described as follows:

Operation 1. The terminal obtains a breeding instruction corresponding to spousal virtual pets.

The spousal virtual pets include a paternal virtual pet and a maternal virtual pet having a spousal relationship. The paternal virtual pet and the maternal virtual pet have different genders. The paternal virtual pet is male (or referred to as masculine), and the maternal virtual pet is female (or referred to as feminine). The gender of the virtual pet may be specified by a user or automatically determined by the virtual pet system, which is not limited in an embodiment of the disclosure. Two virtual pets having a spousal relationship may generate a filial virtual pet through breeding.

The breeding instruction refers to an instruction used for triggering the spousal virtual pets to breed and generate a filial virtual pet. In an embodiment of the disclosure, the breeding instruction is not limited in form, and may be, for example, an instruction in any form such as a touch operation, voice, or a gesture.

In an example, the terminal displays a pet breeding interface, and the pet breeding interface includes a paternal role field and a maternal role field. The paternal role field is a control field used for selecting a virtual pet as a paternal role in the current breeding procedure, and the maternal role field is a control field used for selecting a virtual pet as a maternal role in the current breeding procedure. The terminal adds a paternal virtual pet to the paternal role field according to a first operation, and adds a maternal virtual pet to the maternal role field according to a second operation. The first operation may be an operation such as dragging or tapping, and the second operation may also be an operation such as dragging or tapping. After obtaining a confirmation control corresponding to the pet breeding interface, the terminal obtains the breeding instruction corresponding to the spousal virtual pets. The confirmation control is an operation control used for triggering the breeding instruction, such as a button.

Operation 2. The terminal transmits a breeding request to the server according to the breeding instruction.

The breeding request carries information about the paternal virtual pet and information about the maternal virtual pet. The information about the paternal virtual pet and the information about the maternal virtual pet may be identification information of the paternal virtual pet and identification information of the maternal virtual pet, or may be gene information of the paternal virtual pet and gene information of the maternal virtual pet, or other information that may uniquely indicate the paternal virtual pet and the maternal virtual pet.

Operation 3. The server generates information about a filial virtual pet based on a genetic inheritance rule according to the information about the paternal virtual pet and the information about the maternal virtual pet.

In an embodiment of the disclosure, specific content of the genetic inheritance rule is not limited. Gene information of each virtual pet has global uniqueness, and gene information of any two virtual pets are not completely the same.

In an example, the server may determine gene information of a filial virtual pet based on the genetic inheritance rule according to gene information of a paternal virtual pet and gene information of a maternal virtual pet, then determine features of the filial virtual pet according to the gene information of the filial virtual pet, and then provide a pet image of the filial virtual pet according to the features of the filial virtual pet.

Operation 4. The server transmits the information about the filial virtual pet to the terminal.

The information about the filial virtual pet transmitted by the server to the terminal may include at least one of the following: pet image, name, generation and the like.

Operation 5. The terminal displays the information about the filial virtual pet.

Moreover, after the server receives the breeding request transmitted by the terminal, the following operations 6 to 8 are further performed:

Operation 6. The server obtains genealogy information of the paternal virtual pet and genealogy information of the maternal virtual pet from the blockchain system.

The server may transmit a genealogy obtaining request to the blockchain system, where the genealogy obtaining request carries the identification information of the paternal virtual pet and the identification information of the maternal virtual pet. After receiving the genealogy obtaining request, the blockchain system obtains the genealogy information of the paternal virtual pet and the genealogy information of the maternal virtual pet, and then feeds the genealogy information of the paternal virtual pet and the genealogy information of the maternal virtual pet back to the server.

Operation 7. The server generates genealogy information of the filial virtual pet according to the genealogy information of the paternal virtual pet and the genealogy information of the maternal virtual pet.

Figure 7:
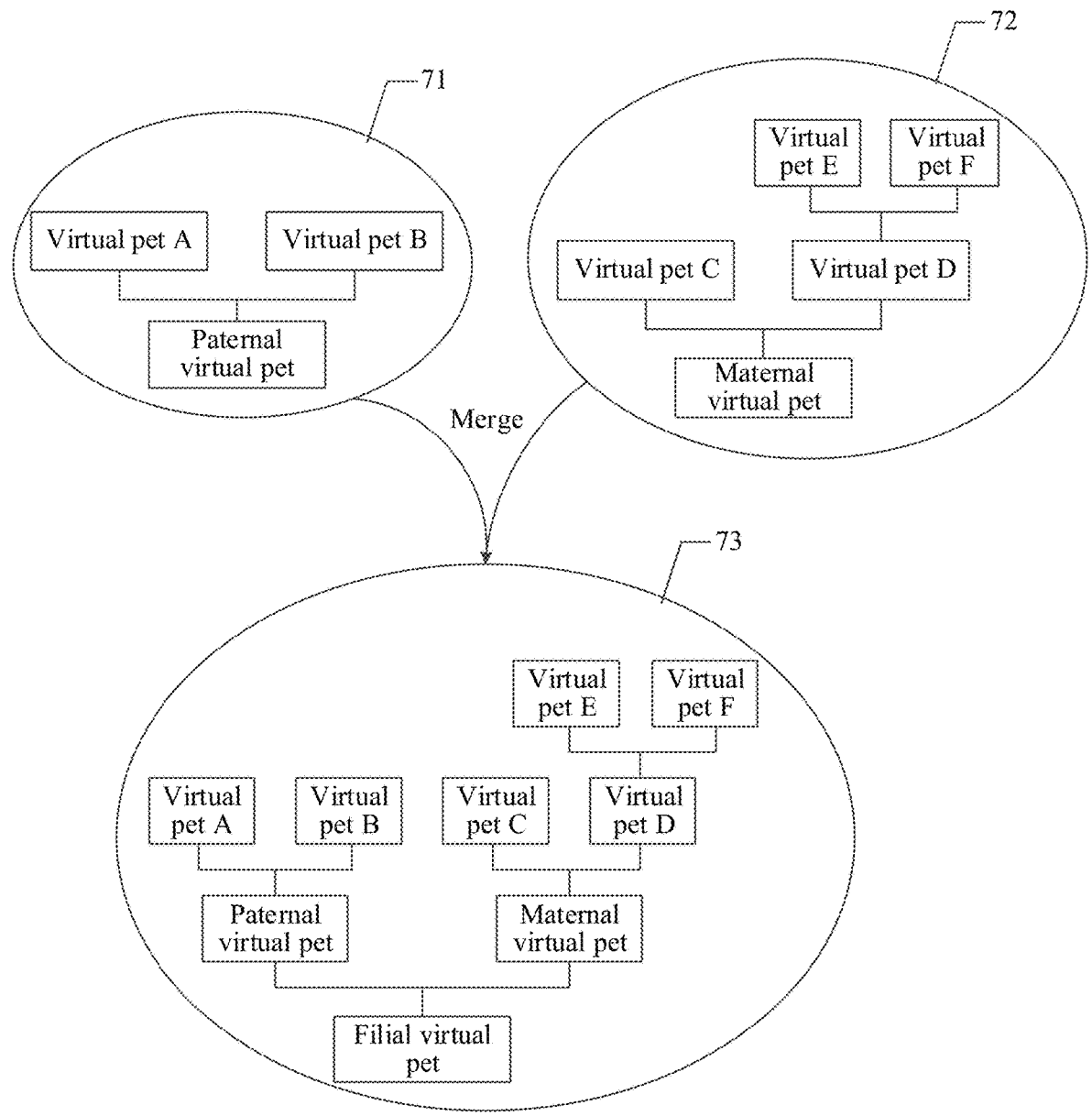
FIG. 7 is an example schematic diagram of genealogy information of parental and filial virtual pets.

The server merges the genealogy information of the paternal virtual pet and the genealogy information of the maternal virtual pet, to generate the genealogy information of the filial virtual pet. FIG. 7 is an example schematic diagram of genealogy information of parental virtual pets and a filial virtual pet. Genealogy information 71 of a paternal virtual pet includes a virtual pet A and a virtual pet B. Genealogy information 72 of a maternal virtual pet includes a virtual pet C, a virtual pet D, a virtual pet E and a virtual pet F. The genealogy information 71 of the paternal virtual pet and the genealogy information 72 of the maternal virtual pet are merged, to obtain genealogy information 73 of a filial virtual pet including the paternal virtual pet, the maternal virtual pet, the virtual pet A, the virtual pet B, the virtual pet C, the virtual pet D, the virtual pet E and the virtual pet F. The virtual pets contained in the genealogy information of the filial virtual pet generated after merging are actually a union set of the virtual pets contained in the genealogy information of the paternal virtual pet, the virtual pets contained in the genealogy information of the maternal virtual pet, the paternal virtual pet and the maternal virtual pet.

Operation 8. The server stores the genealogy information of the filial virtual pet in the blockchain system.

The server may transmit a genealogy storage request to the blockchain system, where the genealogy storage request carries identification information of the filial virtual pet and the genealogy information of the filial virtual pet. After receiving the foregoing genealogy storage request, the blockchain system stores the identification information of the filial virtual pet and the genealogy information of the filial virtual pet.

Optionally, after the server merges the genealogy information of the paternal virtual pet and the genealogy information of the maternal virtual pet, to generate the genealogy information of the filial virtual pet, the following operations A and B are further performed:

Operation A. The server detects whether a quantity of virtual pets that is contained in the genealogy information of the filial virtual pet is greater than a preset threshold k, where k is a positive integer.

A value of the preset threshold k may be preset according to an actual requirement. For example, k is 50, 100 or 200.

Operation B. The server obtains, through screening, k virtual pets having a highest generation in a case that the quantity of virtual pets that is contained in the genealogy information of the filial virtual pet is greater than the preset threshold k, and deletes virtual pets in the genealogy information of the filial virtual pet other than the k virtual pets.

In an embodiment of the disclosure, the generation of a first-generation virtual pet is the lowest. For example, the generation of the first-generation virtual pet is 0. The generation of a non-first-generation virtual pet is determined by generations of the parental virtual pets thereof. The generation of the filial virtual pet bred and generated by the parental virtual pets is higher than those of the parental virtual pets thereof. In an example, if only parental virtual pets of the same generation are allowed to breed and generate a filial virtual pet (that is, next-generation virtual pet), the generation of the filial virtual pet is equal to the generation of the parental virtual pets plus one. For example, if the generations of the parental virtual pets are both 1, the generation of the filial virtual pet is 2. For another example, if the generations of the parental virtual pets are both 0, the generation of the filial virtual pet is 1. In another example, if not only parental virtual pets of the same generation are allowed to breed and generate a filial virtual pet (that is, next-generation virtual pet), but also parental virtual pets of different generations are allowed to breed and generate a filial virtual pet, the generation of the filial virtual pet is equal to the generation of one of parental virtual pets with the higher generation plus one. For example, when the generation of the paternal virtual pet is 0 and the generation of the maternal virtual pet is 2, the generation of the filial virtual pet is 3.

After the server merges the genealogy information of the parental virtual pets to obtain the genealogy information of the filial virtual pet, in a case that the quantity of virtual pets that is contained in the genealogy information of the filial virtual pet is greater than the preset threshold k, the server sorts, according to generations, virtual pets contained in the genealogy information of the filial virtual pet, selects k virtual pets having a highest generation according to a sorting result, retains information about the k virtual pets in the genealogy information of the filial virtual pet, and deletes virtual pets in the genealogy information of the filial virtual pet other than the k virtual pets, to ensure that the genealogy information of the filial virtual pet contain information about no greater than k virtual pets.

Through the foregoing manner, the data volume of genealogy information of virtual pets is controlled, to not only save storage resources of the blockchain system and consumed transmission resources required for receiving/transmitting the genealogy information, but also prevent the genealogy information displayed by the terminal from being excessively redundant.

Genealogy information of any virtual pet (taking the target virtual pet as an example) stored in the blockchain system may include information about a virtual pet having a genetic relationship with the target virtual pet, or may include information about a virtual pet that has a genetic relationship with the target virtual pet and that belongs to a particular type, or may include information about a virtual pet having a genetic relationship with the target virtual pet, and the virtual pet of the foregoing virtual pets that belongs to the particular type is recorded. If the server provides the terminal only with the information about the virtual pet belonging to the particular type in the genealogy information, when the server requests to obtain the genealogy information of the target virtual pet from the blockchain system, the genealogy information of the target virtual pet fed by the blockchain system back to the server may include the information about the virtual pet having the genetic relationship with the target virtual pet, the virtual pet of the foregoing virtual pets that belongs to the particular type is recorded, and subsequently the server performs screening from the foregoing virtual pets and then gives feedback to the terminal; or the genealogy information of the target virtual pet fed by the blockchain system back to the server may only include the information about the virtual pet that has the genetic relationship with the target virtual pet and that belongs to the particular type.

Further, an order of performing operations 6 to 8 and operations 3 and 4 is not limited in an embodiment of the disclosure. Operations 6 to 8 may be performed before operations 3 and 4, or may be performed after operations 3 and 4, or performed at the same time as operations 3 and 4.

Optionally, after the server receives the breeding request transmitted by the terminal, the following operations C-E are further performed:

Operation C. Detect whether the breeding request meets a second response condition.

The second response condition includes but is not limited to at least one of the following: a user account logging in to the terminal has activated a virtual pet system, the virtual pet system is in an enabled state, the user account logging in to the terminal is an owner of the maternal virtual pet, and the filial virtual pet has reached a breeding and birth time.

Operation D. Perform operations 3 and 4 and operations 6 to 8 in a case that the breeding request meets the second response condition.

Operation E. In a case that the breeding request does not meet the second response condition, end the process, or the server transmits a request failure response to the terminal.

Through the foregoing manner, the server performs conditional verification on the received breeding request, and then processes the breeding request if the breeding request meets the second response condition, so that breeding of virtual pets is more normative and controllable.

To sum up, in the technical solutions provided in an embodiment of the disclosure, in a procedure of breeding and generating a filial virtual pet, genealogy information of the filial virtual pet is generated, and the genealogy information of the filial virtual pet is stored in the blockchain system, to obtain the genealogy information and provide the genealogy information to the terminal as required.

In an example, in which a virtual pet is a virtual pet cat, a generating and storage process and an obtaining process of genealogy information of the virtual pet are provided.

Figure 8:
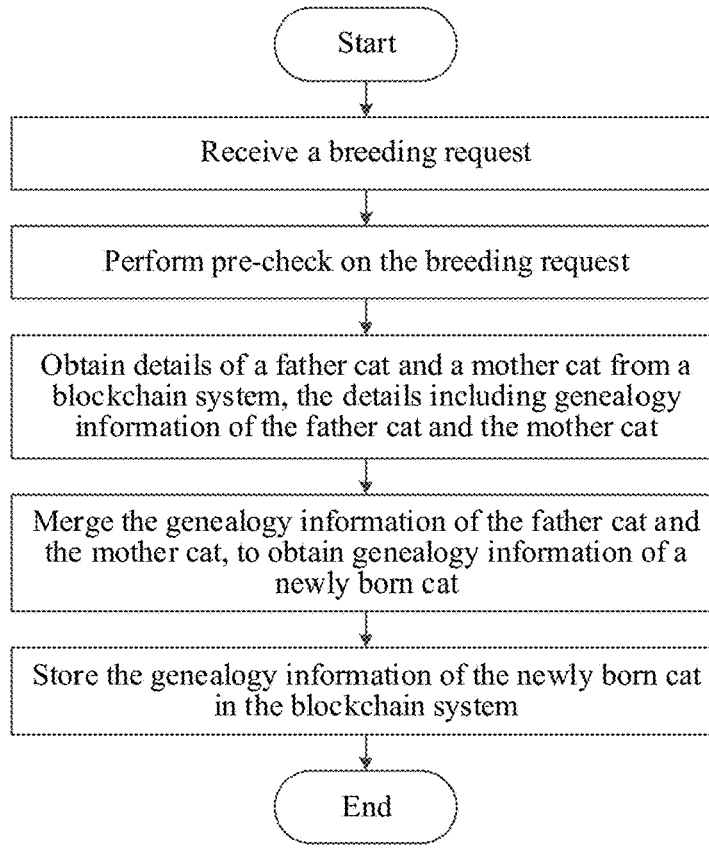
FIG. 8 is an example schematic diagram of a generating and storage process of genealogy information.

As shown in FIG. 8, a generating and storage process of genealogy information may include the following operations 8-1 to 8-5:

Operation 8-1. A server receives a breeding request transmitted by a terminal.

For example, the breeding request carries information about a father cat and information about a mother cat.

Operation 8-2. The server performs pre-check on the breeding request.

For example, the performing pre-check on the breeding request may include checking at least one of the following information: a user account logging in to the terminal has activated a virtual pet cat system, whether the virtual pet cat system is in an enabled state, whether the user account logging in to the terminal is an owner of the mother cat, and whether a newly born cat has reached a breeding and birth time.

Operation 8-3. After the pre-check succeeds, the server obtains details of the father cat and the mother cat from a blockchain system, the details including genealogy information of the father cat and the mother cat.

Optionally, the details of the father cat and the mother cat further include gene information of the father cat and the mother cat, and the server determines gene information of the newly born cat according to the gene information of the father cat and the mother cat.

Operation 8-4. Merge the genealogy information of the father cat and the mother cat, to obtain genealogy information of the newly born cat.

In genealogy information of newly born cats, cats may be sorted in descending order of generations. When there are more than 200 cats in a sequence, 200 cats whose generations are highest are retained in the sequence; and when there are 200 or less cats in the sequence, screening processing is not performed.

Operation 8-5. Store the genealogy information of the newly born cat in the blockchain system.

Figure 9:
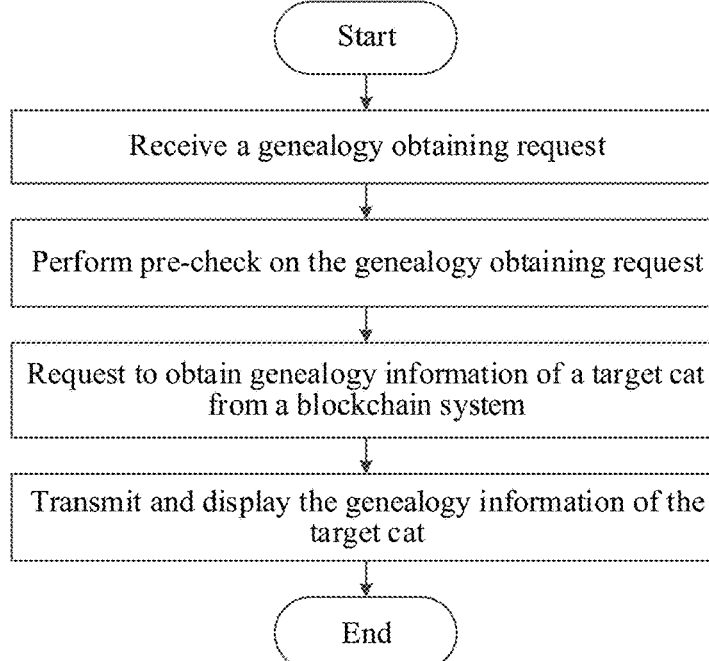
FIG. 9 is an example schematic diagram of an obtaining process of genealogy information.

As shown in FIG. 9, an obtaining process of genealogy information may include the following operations 9-1 to 9-4:

Operation 9-1. A server receives a genealogy obtaining request transmitted by a terminal.

For example, the genealogy obtaining request carries identification information of a target cat.

Operation 9-2. The server performs pre-check on the genealogy obtaining request.

For example, the performing pre-check on the genealogy obtaining request may include checking at least one of the following information: a user account logging in to the terminal has activated a virtual pet cat system, whether the virtual pet cat system is in an enabled state, and whether the target cat is a first-generation cat.

Operation 9-3. After the pre-check succeeds, the server requests to obtain genealogy information of the target cat from a blockchain system.

Operation 9-4. The server transmits the genealogy information of the target cat to the terminal for display.

The following is an apparatus embodiment of the disclosure, which may be used to execute the method embodiments of the disclosure. For details not disclosed in the apparatus embodiment of the disclosure, the method embodiments of the disclosure may be referred to.

Figure 10:
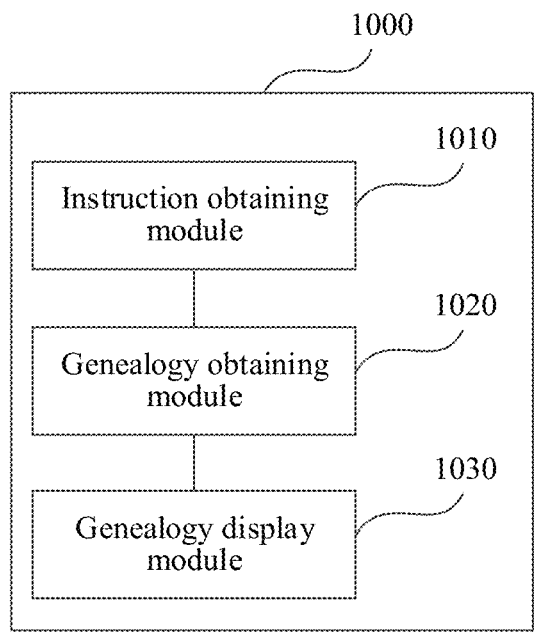
FIG. 10 is a block diagram of an information display apparatus for a virtual pet according to an embodiment of the disclosure.

FIG. 10 is a block diagram of an information display apparatus for a virtual pet according to an embodiment of the disclosure. The apparatus has functions of implementing one or more of the foregoing method examples on the terminal side. The functions may be implemented by using hardware, or may be implemented by hardware executing corresponding software. The apparatus 1000 may include: an instruction obtaining module 1010, a genealogy obtaining module 1020 and a genealogy display module 1030.

The instruction obtaining module 1010 is configured to obtain a genealogy display instruction corresponding to a target virtual pet.

The genealogy obtaining module 1020 is configured to obtain genealogy information of the target virtual pet according to the genealogy display instruction, the genealogy information of the target virtual pet including: information about n virtual pets having a genetic relationship with the target virtual pet, n being a positive integer.

The genealogy display module 1030 is configured to display the information about the n virtual pets, the information about the virtual pet including a pet image of the virtual pet determined by genes of the virtual pet.

To sum up, in the technical solutions provided in an embodiment of the disclosure, a mechanism of breeding and generating a virtual pet based on a genetic inheritance rule is provided. Under this mechanism, genes of parental virtual pets are handed, through simulation, down to a next generation based on the genetic inheritance rule, and a pet image of a virtual pet is determined by genetic genes obtained by the virtual pet from the parental virtual pets. Therefore, the breeding manner according to an example embodiment is closer to biological breeding in the real world, so that product functions are more real and diversified. Moreover, an embodiment of the disclosure further provides a genealogy display function of a virtual pet, to display genealogy information of the virtual pet, so that a user understands, according to the genealogy information of the virtual pet, an image of an elder pet (or an ancestor pet) having a genetic relationship with the virtual pet, and then learns ancestry information of the virtual pet, thereby providing more useful information for value prediction of the virtual pet in a breeding market and a trading market, to further enrich product functions.

In an optional embodiment provided based on the embodiment in FIG. 10, the n virtual pets belong to a particular type, where types of the virtual pets are classified according to extrinsic features of the virtual pets, the particular type of virtual pet refers to a virtual pet having high-quality extrinsic features, and the high-quality extrinsic features include an extrinsic feature having an occurrence probability less than a preset probability and/or an extrinsic feature having a feature level higher than a preset level.

In another optional embodiment provided based on the embodiment in FIG. 10 or the foregoing optional embodiment, the genealogy obtaining module 1020 is configured to:

generate, according to the genealogy display instruction, a genealogy obtaining request carrying identification information of the target virtual pet;

transmit the genealogy obtaining request to a server, where the genealogy obtaining request is used for triggering the server to obtain the genealogy information of the target virtual pet from a blockchain system; and receive the genealogy information of the target virtual pet transmitted by the server.

In another optional embodiment provided based on the embodiment in FIG. 10 or the foregoing optional embodiment, the genealogy display module 1030 is configured to:

display cards respectively corresponding to the n virtual pets in an array form, where a card corresponding to an $i^{th}$ virtual pet of the n virtual pets includes information about the $i^{th}$ virtual pet, i being a positive integer less than or equal to n.

In another optional embodiment provided based on the embodiment in FIG. 10 or the foregoing optional embodiment, the apparatus 1000 further includes a pet breeding module, configured to:

obtain a breeding instruction corresponding to spousal virtual pets, where the spousal virtual pets include a paternal virtual pet and a maternal virtual pet having a spousal relationship;

transmit a breeding request to the server according to the breeding instruction, where the breeding request carries information about the paternal virtual pet and information about the maternal virtual pet;

receive information, transmitted by the server, about a filial virtual pet bred and generated by the paternal virtual pet and the maternal virtual pet; and display the information about the filial virtual pet.

Figure 11:
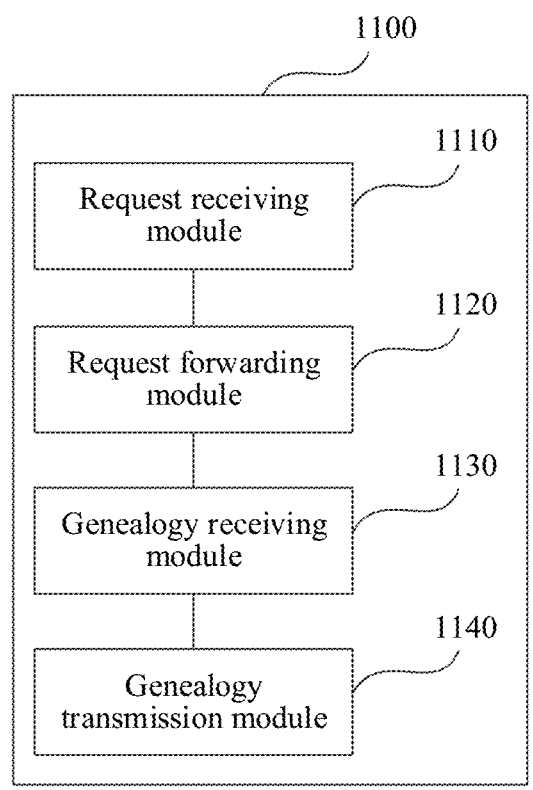
FIG. 11 is a block diagram of an information display apparatus for a virtual pet according to another embodiment of the disclosure.

FIG. 11 is a block diagram of an information display apparatus for a virtual pet according to another embodiment of the disclosure. The apparatus has functions of implementing one or more of the foregoing method examples on the server side. The functions may be implemented by using hardware, or may be implemented by hardware executing corresponding software. The apparatus 1100 may include: a request receiving module 1110, a request forwarding module 1120, a genealogy receiving module 1130 and a genealogy transmission module 1140.

The request receiving module 1110 is configured to receive a genealogy obtaining request that carries identification information of a target virtual pet and that is transmitted by a terminal, the genealogy obtaining request being used for requesting to obtain genealogy information of the target virtual pet.

The request forwarding module 1120 is configured to forward the genealogy obtaining request to a blockchain system.

The genealogy receiving module 1130 is configured to receive genealogy information of the target virtual pet transmitted by the blockchain system, the genealogy information of the target virtual pet including information about n virtual pets having a genetic relationship with the target virtual pet, the information about the virtual pet including a pet image of the virtual pet determined by genes of the virtual pet, and n being a positive integer.

The genealogy transmission module 1140 is configured to transmit the genealogy information of the target virtual pet to the terminal for display.

To sum up, in the technical solutions provided in an embodiment of the disclosure, a mechanism of breeding and generating a virtual pet based on a genetic inheritance rule is provided. Under this mechanism, genes of parental virtual pets are handed, through simulation, down to a next generation based on the genetic inheritance rule, and a pet image of a virtual pet is determined by genetic genes obtained by the virtual pet from the parental virtual pets. Therefore, the breeding manner according to an example embodiment is closer to biological breeding in the real world, so that product functions are more real and diversified. Moreover, an embodiment of the disclosure further provides a genealogy display function of a virtual pet, to display genealogy information of the virtual pet, so that a user understands, according to the genealogy information of the virtual pet, an image of an elder pet (or an ancestor pet) having a genetic relationship with the virtual pet, and then learns ancestry information of the virtual pet, thereby providing more useful information for value prediction of the virtual pet in a breeding market and a trading market, to further enrich product functions.

In an optional embodiment provided based on the embodiment in FIG. 11, the n virtual pets belong to a particular type, where types of the virtual pets are classified according to extrinsic features of the virtual pets, the particular type of virtual pet refers to a virtual pet having high-quality extrinsic features, and the high-quality extrinsic features include an extrinsic feature having an occurrence probability less than a preset probability and/or an extrinsic feature having a feature level higher than a preset level.

In another optional embodiment provided based on the embodiment in FIG. 11 or the foregoing optional embodiment, the apparatus 1100 further includes a detection module.

The detection module is configured to detect whether the genealogy obtaining request meets a first response condition, where the first response condition includes at least one of the following: a user account logging in to the terminal has activated a virtual pet system, the virtual pet system is in an enabled state, and the target virtual pet is not a first-generation virtual pet; and the request forwarding module 1120 is further configured to forward the genealogy obtaining request to a blockchain system in a case that the genealogy obtaining request meets the first response condition.

In another optional embodiment provided based on the embodiment in FIG. 11 or the foregoing optional embodiment, the apparatus 1100 further includes a breeding request receiving module, a breeding execution module and an information transmission module.

The breeding request receiving module is configured to receive a breeding request transmitted by the terminal, where the breeding request carries information about a paternal virtual pet and information about a maternal virtual pet, and the paternal virtual pet and the maternal virtual pet have a spousal relationship.

The breeding execution module is configured to generate information about a filial virtual pet based on a genetic inheritance rule according to the information about the paternal virtual pet and the information about the maternal virtual pet.

The information transmission module is configured to transmit the information about the filial virtual pet to the terminal.

Optionally, the apparatus 1100 further includes: a genealogy pulling module, a genealogy generating module and a genealogy storage module.

The genealogy pulling module is configured to obtain genealogy information of the paternal virtual pet and genealogy information of the maternal virtual pet from the blockchain system.

The genealogy generating module is configured to generate genealogy information of the filial virtual pet according to the genealogy information of the paternal virtual pet and the genealogy information of the maternal virtual pet.

The genealogy storage module is configured to store the genealogy information of the filial virtual pet in the blockchain system.

Optionally, the apparatus 1100 further includes: a quantity detection module and a genealogy screening module.

The quantity detection module is configured to detect whether a quantity of virtual pets that is contained in the genealogy information of the filial virtual pet is greater than a preset threshold k, where the preset threshold k is a positive integer.

The genealogy screening module is configured to obtain, through screening, k virtual pets having a highest generation in a case that the quantity of virtual pets that is contained in the genealogy information of the filial virtual pet is greater than the preset threshold k, and delete virtual pets in the genealogy information of the filial virtual pet other than the k virtual pets.

When the apparatus provided in the foregoing embodiment implements the functions of the apparatus, only some function modules are used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to the inventive concept of the disclosure. For the specific implementation of the apparatus embodiment, details of the foregoing method embodiments may be referred to, and details are not described herein again.

Figure 12:
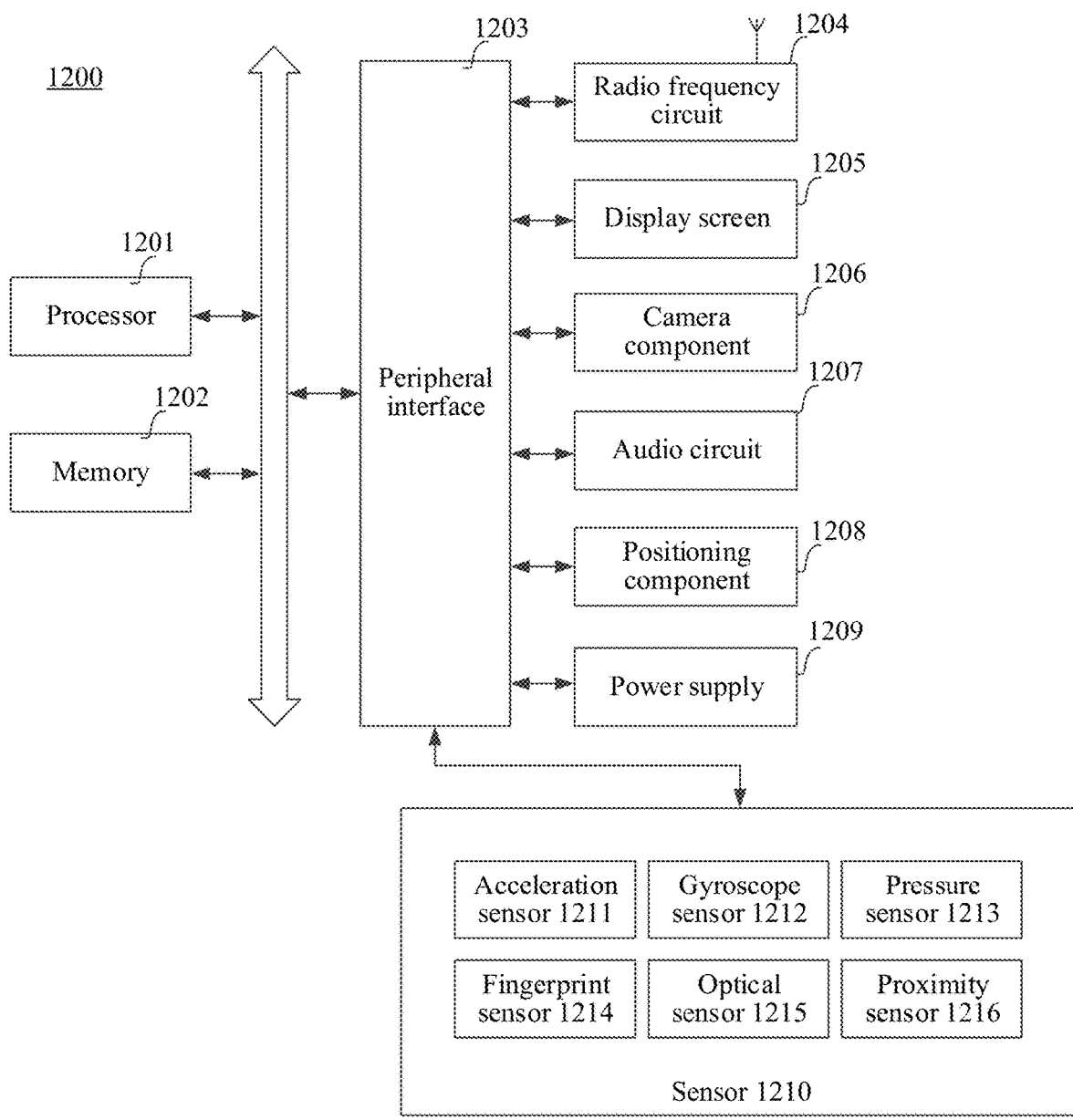
FIG. 12 is a structural block diagram of a terminal according to an embodiment of the disclosure.

FIG. 12 is a structural block diagram of a terminal 1200 according to an embodiment of the disclosure. The terminal 1200 may be a mobile phone, a game console, a tablet computer, a multimedia playback device, a personal computer (PC) or the like.

Typically, the terminal 1200 includes: a processor 1201 and a memory 1202.

The processor 1201 may include one or more processing cores, for example, a 4-core processor or an 8-core processor. The processor 1201 may be implemented in at least one hardware form of a digital signal processor (DSP), a field programmable gate array (FPGA), and a programmable logic array (PLA). The processor 1201 may alternatively include a main processor and a coprocessor. The main processor is configured to process data in an awake state, also referred to as a central processing unit (CPU); and the coprocessor is a low-power processor configured to process data in a standby state. In some embodiments, the processor 1201 may be integrated with a graphics processing unit (GPU). The GPU is configured to be responsible for rendering and drawing content that a display screen needs to display. In some embodiments, the processor 1201 may further include an artificial intelligence (AI) processor. The AI processor is configured to process a computing operation related to machine learning.

The memory 1202 may include one or more computer-readable storage media. The computer-readable storage medium may be non-transient. The memory 1202 may further include a high-speed random access memory and a non-volatile memory such as one or more magnetic disk storage devices and a flash storage device. In some embodiments, the non-transitory computer-readable storage medium in the memory 1202 is configured to store at least one instruction, and the at least one instruction being configured to be executed by the processor 1201 to implement the method provided in the method embodiments of the disclosure. Specifically, the peripheral includes: at least one of a radio frequency (RF) circuit 1204, a touch display screen 1205, a camera component 1206, an audio circuit 1207, a positioning component 1208, and a power supply 1209.

The peripheral interface 1203 may be configured to connect at least one peripheral related to input/output (I/O) to the processor 1201 and the memory 1202. In some embodiments, the processor 1201, the memory 1202, and the peripheral interface 1203 are integrated into the same chip or circuit board; and in some other embodiments, any one or two of the processor 1201, the memory 1202, and the peripheral interface 1203 may be implemented on an independent chip or circuit board. This is not limited in an embodiment.

The RF circuit 1204 is configured to receive and transmit an RF signal, which is also referred to as an electromagnetic signal. The radio frequency circuit 1204 communicates with a communication network and another communication device by using the electromagnetic signal. The RF circuit 1204 converts an electric signal into an electromagnetic signal for transmission, or converts a received electromagnetic signal into an electric signal. Optionally, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other devices through at least one wireless communication protocol. The wireless communication protocol includes, but is not limited to: a metropolitan area network, various generations of mobile communication networks (e.g., 2G, 3G, 4G, and 5G), a wireless local area network and/or a wireless fidelity (Wi-Fi) network. In some embodiments, the RF circuit 1204 may also include a circuit related to near field communication (NFC). This is not limited in the disclosure.

The display screen 1205 is configured to display a user interface (UI). The UI may include a graph, a text, an icon, a video, and any combination thereof. When the display screen 1205 is a touch display screen, the display screen 1205 is further capable of acquiring a touch signal on or above a surface of the display screen 1205. The touch signal may be inputted to the processor 1201 for processing as a control signal. In this case, the display screen 1205 may be further configured to provide a virtual button and/or a virtual keyboard, which is also referred to as a soft button and/or a soft keyboard. In some embodiments, there may be one display screen 1205, disposed on a front panel of the terminal 1200. In other some embodiments, there may be at least two display screens 1205, disposed on different surfaces of the terminal 1200 respectively or in a folded design. In still other embodiments, the display screen 1205 may be a flexible display screen, disposed on a curved surface or a folded surface of the terminal 1200. Even, the display screen 1205 may be further set in a non-rectangular irregular pattern, namely, a special-shaped screen. The display screen 1205 may be prepared by using a material such as a liquid crystal display (LCD), an organic light-emitting diode (OLED), or the like.

The camera component 1206 is configured to acquire an image or a video. Optionally, the camera component 1206 includes a front-facing camera and a rear-facing camera. Generally, the front-facing camera is disposed on the front panel of the computer device, and the rear-facing camera is disposed on a back face of the computer device. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 1206 may further include a flash. The flash may be a single color temperature flash, or may be a double color temperature flash. The double color temperature flash is a combination of a warm light flash and a cold light flash, and may be used for light compensation under different color temperatures.

The audio circuit 1207 may include a microphone and a speaker. The microphone is configured to: acquire sound waves of a user and an environment, and convert the sound waves into electrical signals and input the electrical signals into the processor 1201 for processing, or input the electrical signals into the RF circuit 1204 to implement speech communication. For the purpose of stereo acquisition or noise reduction, there may be a plurality of microphones, disposed at different parts of the terminal 1200 respectively. The microphone may be further an array microphone or an omnidirectional acquisition microphone. The speaker is configured to convert electrical signals from the processor 1201 or the RF circuit 1204 into sound waves. The speaker may be a conventional thin-film speaker, or may be a piezoelectric ceramic speaker. When the speaker is the piezoelectric ceramic speaker, electrical signals not only may be converted into sound waves that may be heard by human, but also may be converted into sound waves that cannot be heard by human for ranging and other uses. In some embodiments, the audio circuit 1207 may also include an earphone jack.

The positioning component 1208 is configured to determine a current geographic location of the terminal 1200, to implement a navigation or a location based service (LBS). The positioning component 1208 may be a positioning component based on the Global Positioning System (GPS) of the United States, the BeiDou system of China, the GLONASS System of Russia, or the GALILEO System of the European Union.

The power supply 1209 is configured to supply power for various components in the terminal 1200. The power supply 1209 may be an alternating current, a direct current, a disposable battery, or a rechargeable battery. When the power supply 1209 includes a rechargeable battery, the rechargeable battery may be a wired rechargeable battery or a wireless rechargeable battery. The rechargeable battery may further be configured to support a quick charge technology.

In some embodiments, the terminal 1200 may also include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect accelerations on three coordinate axes of a coordinate system established by the terminal 1200. For example, the acceleration sensor 1211 may be configured to detect components of the gravity acceleration on the three coordinate axes. The processor 1201 may control, according to a gravity acceleration signal acquired by the acceleration sensor 1211, the touch display screen 1205 to display the user interface in a frame view or a portrait view. The acceleration sensor 1211 may be further configured to acquire game or user motion data.

The gyroscope sensor 1212 may detect a body direction and a rotation angle of the terminal 1200. The gyroscope sensor 1212 may acquire a 3D action of the user on the terminal 1200 together with the acceleration sensor 1211. The processor 1201 may implement the following functions according to the data acquired by the gyroscope sensor 1212: motion sensing (such as changing the UI according to a tilt operation of the user), image stabilization during shooting, game control, and inertial navigation.

The pressure sensor 1213 may be disposed on a side frame of the terminal 1200 and/or a lower layer of the touch display screen 1205. When the pressure sensor 1213 is disposed on the side frame of the terminal 1200, a holding signal of the user to the terminal 1200 may be detected, and left/right hand identification or a quick action may be performed by the processor 1201 according to the holding signal acquired by the pressure sensor 1213. When the pressure sensor 1213 is disposed on the lower layer of the touch display screen 1205, the processor 1201 controls an operable control on the UI interface according to a pressure operation of the user on the touch display screen 1205. The operable control includes at least one of a button control, a scroll bar control, an icon control and a menu control.

The fingerprint sensor 1214 is configured to acquire a user's fingerprint, and the processor 1201 identifies a user's identity according to the fingerprint acquired by the fingerprint sensor 1214, or the fingerprint sensor 1214 identifies a user's identity according to the acquired fingerprint. When the identity of the user is identified as a trusted identity, the processor 1201 authorizes the user to perform a related sensitive operation. The sensitive operation includes unlocking a screen, viewing encryption information, downloading software, payment, changing settings, and the like. The fingerprint sensor 1214 may be disposed on a front face, a back face, or a side face of the terminal 1200. When a physical button or a vendor logo is disposed on the terminal 1200, the fingerprint sensor 1214 may be integrated together with the physical button or the vendor logo.

The optical sensor 1215 is configured to acquire ambient light intensity. In an embodiment, the processor 1201 may control the display brightness of the touch display screen 1205 according to the ambient light intensity acquired by the optical sensor 1215. Specifically, when the ambient light intensity is relatively high, the display brightness of the touch display screen 1205 is turned up. When the ambient light intensity is relatively low, the display brightness of the touch display screen 1205 is turned down. In another embodiment, the processor 1201 may further dynamically adjust a camera parameter of the camera component 1206 according to the ambient light intensity acquired by the optical sensor 1215.

The proximity sensor 1216, also referred to as a distance sensor, is typically disposed on a front panel of the terminal 1200. The proximity sensor 1216 is configured to acquire a distance between a user and the front surface of the terminal 1200. In an embodiment, when the proximity sensor 1216 detects that the distance between the user and the front surface of the terminal 1200 gradually becomes small, the touch display screen 1025 is controlled by the processor 1201 to switch from a screen-on state to a screen-off state. When the proximity sensor 1216 detects that the distance between the user and the front surface of the terminal 1200 gradually becomes large, the processor 1201 controls the touch display screen 1205 to switch from the screen-off state to the screen-on state.

A person skilled in the art may understand that the structure shown in FIG. 12 does not constitute a limitation on the terminal 1200, and the terminal may include more or fewer components than those shown in the figure, or some components may be combined, or a different component deployment may be used.

Figure 13:
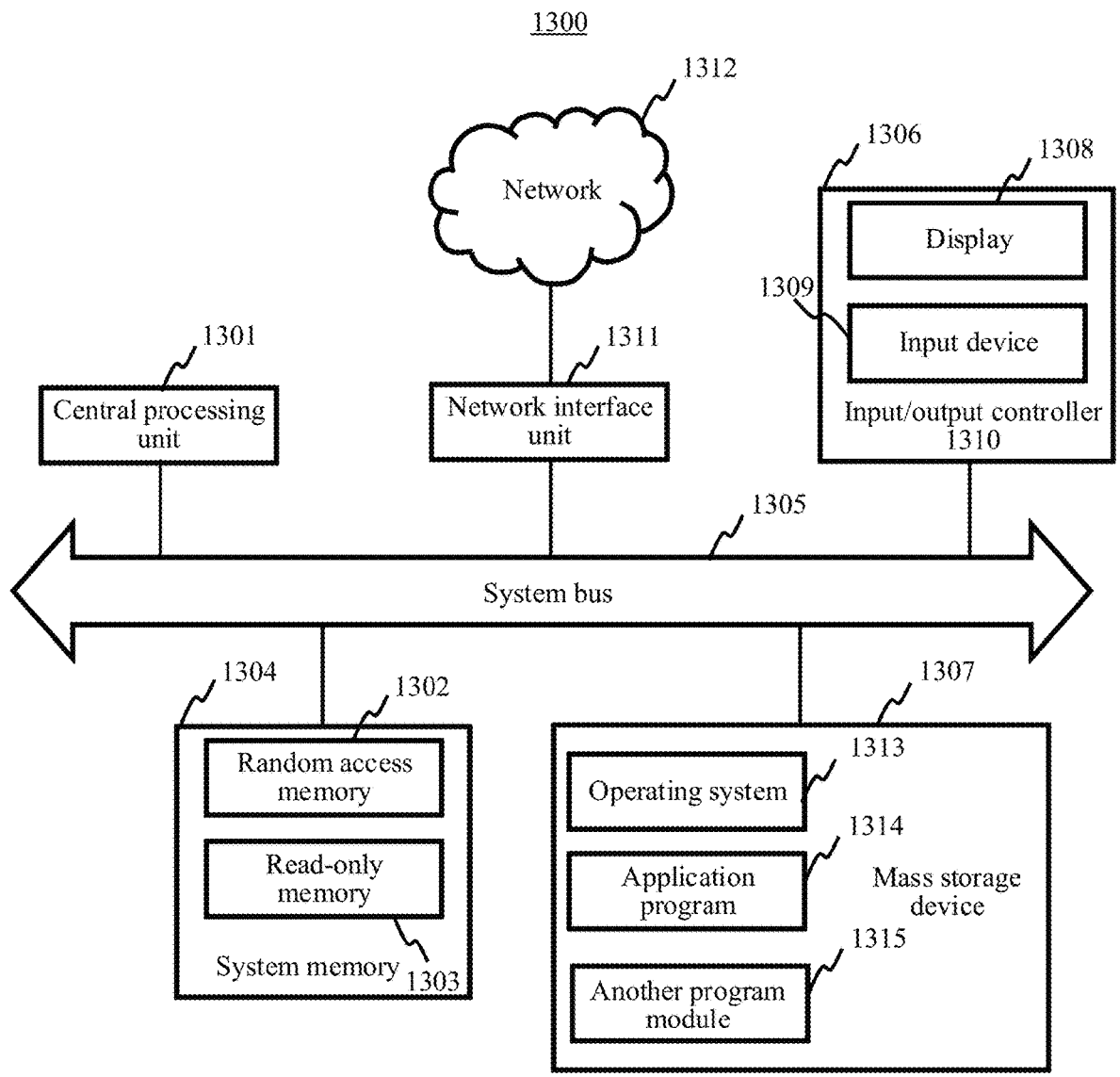
FIG. 13 is a structural block diagram of a server according to an embodiment of the disclosure.

FIG. 13 is a structural block diagram of a server according to an embodiment of the disclosure. The server may be configured to implement the information display method for a virtual pet provided in the foregoing embodiments. Specifically:

The server 1300 includes a central processing unit (CPU) 1301, a system memory 1304 including a random access memory (RAM) 1302 and a read-only memory (ROM) 1303, and a system bus 1305 connecting the system memory 1304 to the CPU 1301. The server 1300 further includes a basic input/output system (I/O system) 1306 assisting in transmitting information between devices in a computer, and a storage device 1307 configured to store an operating system 1313, an application program 1314 and another program module 1315.

The basic I/O system 1306 includes a display 1308 configured to display information and an input device 1309, such as a mouse or a keyboard, configured to input information for a user. The display 1308 and the input device 1309 are both connected to the CPU 1301 by using an input/output controller 1310 connected to the system bus 1305. The basic I/O system 1306 may further include the input/output controller 1310 to be configured to receive and process inputs from multiple other devices such as a keyboard, a mouse, and an electronic stylus. Similarly, the input/output controller 1310 further provides an output to a display screen, a printer, or another type of output device.

The storage device 1307 is connected to the CPU 1301 by using a storage controller (not shown) that is connected to the system bus 1305. The storage device 1307 and its associated computer-readable medium provide non-volatile storage for the server 1300. That is, the storage device 1307 may include the computer-readable medium (not shown) such as a hard disk or a CD-ROM driver.

Without loss of generality, the computer-readable medium may include a computer storage medium and a communications medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, persons skilled in art would understand that the computer storage medium is not limited to the foregoing several types. The system memory 1304 and the storage device 1307 may be collectively referred to as a memory.

According to various embodiments of the disclosure, the server 1300 may further be connected, by using a network such as the Internet, to a remote computer on the network and run. That is, the server 1300 may be connected to a network 1312 by using a network interface unit 1311 connected to the system bus 1305, or may be connected to another type of network or remote computer system (not shown) by using the network interface unit 1311.

The memory further includes one or more programs. The one or more programs are stored in the memory and configured to be executed by one or more processors. The one or more programs include an instruction used for performing the foregoing information display method for a virtual pet.

In an example embodiment, a computer device is further provided, including a processor and a memory, the memory storing at least one computer-readable instruction, at least one program, a code set, or an instruction set. The at least one instruction, the at least one program, the code set, or the instruction set is configured to be executed by one or more processors, to implement the foregoing information display method for a virtual pet.

Optionally, the computer device is a terminal or a server.

In an example embodiment, a computer-readable storage medium is further provided, the storage medium storing at least one computer-readable instruction, at least one program, a code set or an instruction set, and the at least one instruction, the at least one program, the code set or the instruction set, when being executed by the processor of the computer device, implementing the foregoing information display method for a virtual pet.

Optionally, the computer-readable storage medium may be a ROM, a random access memory (RAM), a CD-ROM, a magnetic tape, a floppy disk, an optical data storage device, or the like.

In an example embodiment, a computer program product is provided. When the computer program product is executed, the computer program product is configured to implement the foregoing information display method for a virtual pet.

It is to be understood that "plurality of" mentioned in the specification means two or more. The "and/or" describes an association relationship for describing associated objects and represents that three relationships may exist. For example, A and/or B may represent the following three cases: Only A exists, both A and B exist, and only B exists. The character "/" in this specification generally indicates an "or" or "and/or" relationship between the associated objects.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. An information display method for a virtual object, performed by a processor, the method comprising:
   obtaining an instruction to display genealogy information corresponding to a target virtual object;
   obtaining, from a blockchain system, the genealogy information of the target virtual object based on the instruction, the genealogy information of the target virtual object comprising information about n virtual objects having a genetic relationship with the target virtual object, n being a positive integer,
   wherein, for the target virtual object, the blockchain system stores information of less than a threshold number of virtual objects having the genetic relationship with the target virtual object, and
   wherein the genealogy information has been authenticated through a consensus mechanism for a plurality of nodes on the blockchain system; and
   displaying the information about the n virtual objects, the information about the n virtual objects comprising an image of a virtual object determined by genes of the virtual object,
   wherein the genes of the more than one virtual objects are based on a genetic inheritance rule.

2. The method according to claim 1, wherein types of the n virtual objects are classified according to extrinsic features of the n virtual objects, and
   wherein a virtual object of a particular type has an extrinsic feature of which an occurrence probability is less than a preset probability and/or an extrinsic feature of which a feature level is higher than a preset level.

3. The method according to claim 1, wherein the obtaining the genealogy information comprises:
   generating, based on the instruction, a genealogy obtaining request including identification information of the target virtual object;
   transmitting the genealogy obtaining request to a server; and
   receiving, from the blockchain system via the server, the genealogy information of the target virtual object.

4. The method according to claim 1, wherein the displaying comprises:
   displaying an array of a plurality of pieces of information respectively corresponding to the n virtual objects,
   wherein a piece of information corresponding to an $i^{th}$ virtual object of the n virtual objects comprises information about the $i^{th}$ virtual object, i being a positive integer equal to or greater than 1 and equal to or less than n.

5. The method according to claim 1, further comprising:
   obtaining a breeding instruction corresponding to spousal virtual objects, wherein the spousal virtual objects comprise a paternal virtual object and a maternal virtual object having a spousal relationship;
   transmitting a breeding request to a server according to the breeding instruction, wherein the breeding request includes information about the paternal virtual object and information about the maternal virtual object;
   receiving information, from the server, about a filial virtual object bred and generated by the paternal virtual object and the maternal virtual object; and
   displaying the information about the filial virtual object.

6. A terminal, comprising a processor and a memory, the memory storing at least one computer-readable instruction, and the at least one computer-readable instruction being loaded and executed by the processor to perform the method of claim 1.

7. A non-transitory computer-readable storage medium, storing at least one computer-readable instruction, the at least one computer-readable instruction being loaded and executed by a processor to perform the method of claim 1.

8. An information display method for a virtual object, performed by a processor, the method comprising:
   receiving, from a terminal, a genealogy obtaining request requesting to obtain genealogy information of a target virtual object, the genealogy obtaining request including identification information of the target virtual object;
   forwarding the genealogy obtaining request to a blockchain system;
   receiving the genealogy information of the target virtual object from the blockchain system, the genealogy information of the target virtual object comprising information about n virtual objects having a genetic relationship with the target virtual object, the information about the n virtual objects comprising an image of a virtual object determined by genes of the virtual object wherein the genes of the n virtual objects are based on a genetic inheritance rule, and n being a positive integer, wherein, for the target virtual object, the blockchain system stores information of less than a threshold number of virtual objects having the genetic relationship with the target virtual object, and wherein the genealogy information has been authenticated through a consensus mechanism for a plurality of nodes on the blockchain system; and transmitting the genealogy information of the target virtual object to the terminal to be displayed.

9. The method according to claim 8, wherein types of the n virtual objects are classified according to extrinsic features of the n virtual objects, and wherein a virtual object of a particular type has an extrinsic feature of which an occurrence probability is less than a preset probability and/or an extrinsic feature of which a feature level is higher than a preset level.

10. The method according to claim 8, further comprising: determining whether the genealogy obtaining request meets a first response condition, wherein the first response condition comprises at least one of the following: a user account logged on to the terminal has activated a virtual object system, the virtual object system is in an enabled state, and the target virtual object is not a first-generation virtual object; and based on the genealogy obtaining request satisfying the first response condition, forwarding the genealogy obtaining request to the blockchain system.

11. The method according to claim 8, further comprising: receiving a breeding request from the terminal, wherein the breeding request includes information about a paternal virtual object and information about a maternal virtual object, and the paternal virtual object and the maternal virtual object have a spousal relationship;

generating information about a filial virtual object based on the genetic inheritance rule according to the information about the paternal virtual object and the information about the maternal virtual object; and transmitting the information about the filial virtual object to the terminal.

12. The method according to claim 11, further comprising:

obtaining genealogy information of the paternal virtual object and genealogy information of the maternal virtual object from the blockchain system;

generating genealogy information of the filial virtual object based on the genealogy information of the paternal virtual object and the genealogy information of the maternal virtual object; and storing the genealogy information of the filial virtual object in the blockchain system.

13. The method according to claim 12, further comprising:

determining whether a quantity of a plurality of virtual objects that are included in the genealogy information of the filial virtual object is greater than a preset threshold k, wherein the preset threshold k is a positive integer; and based on the quantity of the plurality of virtual objects that are included in the genealogy information of the filial virtual object being greater than the preset threshold k, obtaining k virtual objects among the plurality of virtual objects in an order of higher generation and deleting, from the genealogy information of the filial virtual object, virtual objects other than the k virtual objects.

14. The method according to claim 11, further comprising:

determining whether the breeding request meets a second response condition, wherein the second response condition comprises at least one of the following: a user account logged on to the terminal has activated a virtual object system, the virtual object system is in an enabled state, the user account logged on to the terminal is an owner of the maternal virtual object, and the filial virtual object has reached a breeding and birth time; and based on the breeding request satisfying the second response condition, generating the information about the filial virtual object based on the genetic inheritance rule according to the information about the paternal virtual object and the information about the maternal virtual object.

15. An information display apparatus for a virtual object, comprising at least one memory configured to store program code, and at least one processor configured to read the program code and operate as instructed by the program code to perform the method of claim 8.

16. A server, comprising at least one processor and a memory, the memory storing at least one computer-readable instruction, and the at least one computer-readable instruction being loaded and executed by the at least one processor to perform the method of claim 8.

17. A non-transitory computer-readable storage medium, storing at least one computer-readable instruction, the at least one computer-readable instruction being loaded and executed by at least one processor to perform the method of claim 8.

18. An information display apparatus for a virtual object comprising:

at least one memory configured to store program code; and at least one processor configured to read the program code and operate as instructed by the program code, the program code comprising:

instruction obtaining code configured to cause at least one of the at least one processor to obtain an instruction to display genealogy information corresponding to a target virtual object;

genealogy obtaining code configured to cause at least one of the at least one processor to obtain, from a blockchain system, the genealogy information of the target virtual object based on the instruction, the genealogy information of the target virtual object comprising: information about n virtual objects having a genetic relationship with the target virtual object, n being a positive integer, wherein, for the target virtual object, the blockchain system stores information of less than a threshold number of virtual objects having the genetic relationship with the target virtual object, and wherein the genealogy information has been authenticated through a consensus mechanism for a plurality of nodes on the blockchain system; and genealogy display code configured to cause at least one of the at least one processor to display the information about the n virtual objects, the information about the n virtual objects comprising an image of a virtual object determined by genes of the virtual object, wherein the genes of the more than one virtual objects are based on a genetic inheritance rue.

19. The apparatus according to claim 18, wherein the genealogy obtaining code further causes at least one of the at least one processor to:
  generate, based on the instruction, a genealogy obtaining request including identification information of the target virtual object;
  transmit the genealogy obtaining request to a server; and
  receive, from the blockchain system via the server, the genealogy information of the target virtual object.

20. The apparatus according to claim 18, wherein the program code further comprises pet breeding code configured to cause at least one of the at least one processor to:
  obtain a breeding instruction corresponding to spousal virtual objects, wherein the spousal virtual objects comprise a paternal virtual object and a maternal virtual object having a spousal relationship;
  transmit a breeding request to a server according to the breeding instruction, wherein the breeding request includes information about the paternal virtual object and information about the maternal virtual object;
  receive information, from the server, about a filial virtual object bred and generated by the paternal virtual object and the maternal virtual object; and
  display the information about the filial virtual object.

* * * * *